United States Patent
Inagaki et al.

(10) Patent No.: US 6,838,854 B2
(45) Date of Patent: Jan. 4, 2005

(54) DIGITAL SIGNAL TO PULSE CONVERTER AND METHOD OF DIGITAL SIGNAL TO PULSE CONVERSION

(75) Inventors: Hiroyuki Inagaki, Aichi-ken (JP); Hideki Kuzuya, Aichi-ken (JP); Hiroaki Kato, Mie-ken (JP); Noboru Sebe, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 25 days.

(21) Appl. No.: 09/961,283

(22) Filed: Sep. 25, 2001

(65) Prior Publication Data

US 2002/0060545 A1 May 23, 2002

(30) Foreign Application Priority Data

Sep. 25, 2000 (JP) .................................. 2000-290703
Jun. 18, 2001 (JP) .................................. 2001-183311

(51) Int. Cl.$^7$ .............................................. H02P 7/05
(52) U.S. Cl. ..................... 318/701; 318/609; 318/611; 318/619
(58) Field of Search ................... 318/139, 254, 318/460, 609–611, 619–623, 630, 632, 701

(56) References Cited

U.S. PATENT DOCUMENTS

| | | | | |
|---|---|---|---|---|
| 5,332,061 A | * | 7/1994 | Majeed et al. | 180/312 |
| 5,346,242 A | * | 9/1994 | Karnopp | 280/707 |
| 5,629,592 A | * | 5/1997 | Henmi | 318/107 |
| 5,821,720 A | * | 10/1998 | Deng et al. | 318/630 |
| 5,828,014 A | * | 10/1998 | Goto et al. | 187/292 |
| 5,990,645 A | * | 11/1999 | Nakamura et al. | 318/432 |
| 5,994,859 A | * | 11/1999 | Deng et al. | 318/432 |
| 6,072,297 A | * | 6/2000 | Xu et al. | 318/630 |
| 6,351,096 B1 | * | 2/2002 | Jang | 318/811 |

* cited by examiner

*Primary Examiner*—Bentsu Ro
(74) *Attorney, Agent, or Firm*—Sughrue Mion, PLLC

(57) ABSTRACT

An electric motor such as a driving source of an electric vehicle is controlled by the microcomputer 7. The microcomputer 7 calculates a target torque Req_trq according to a throttle opening degree α, and outputting induction values (a current instruction value I and a angle instruction value θ) obtained referring to a map MP based on the target torque Req_trq (a motor rotational number Nm and a battery voltage Vb), the microcomputer 7 performs a torque control of an SR motor 3. The motor rotational number Nm detected from the SR motor 3 is passed through a band pass filter 51. Passing by the band pass filter 51, a signal data of the extracted 0.1–50 Hz is executed a PD calculation process 52, the calculated corrected amount PD_out is subtracted from the target torque Req_trq.

4 Claims, 15 Drawing Sheets

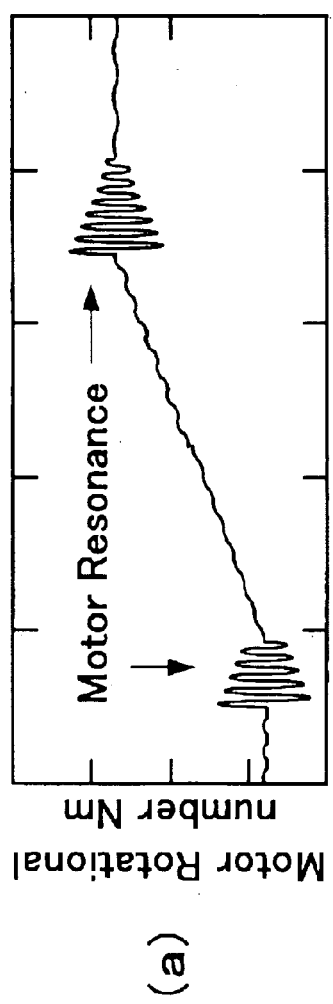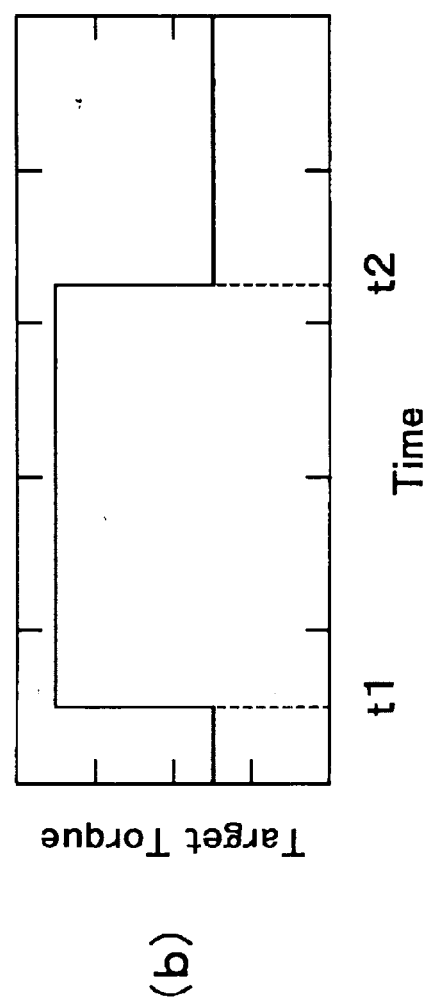

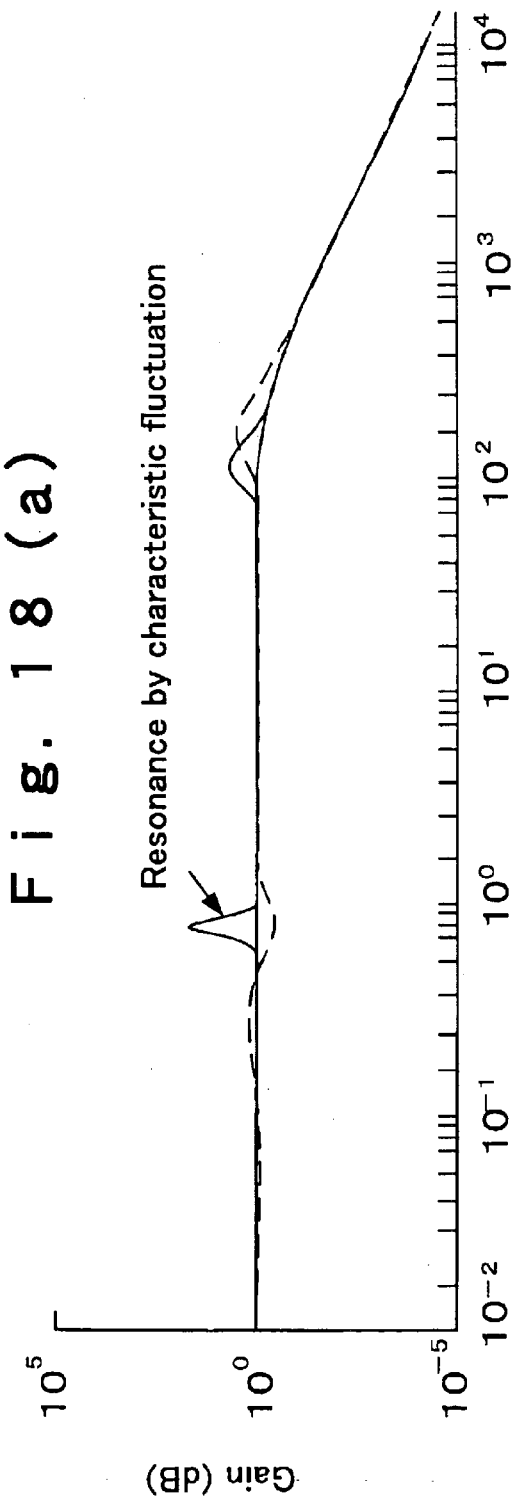
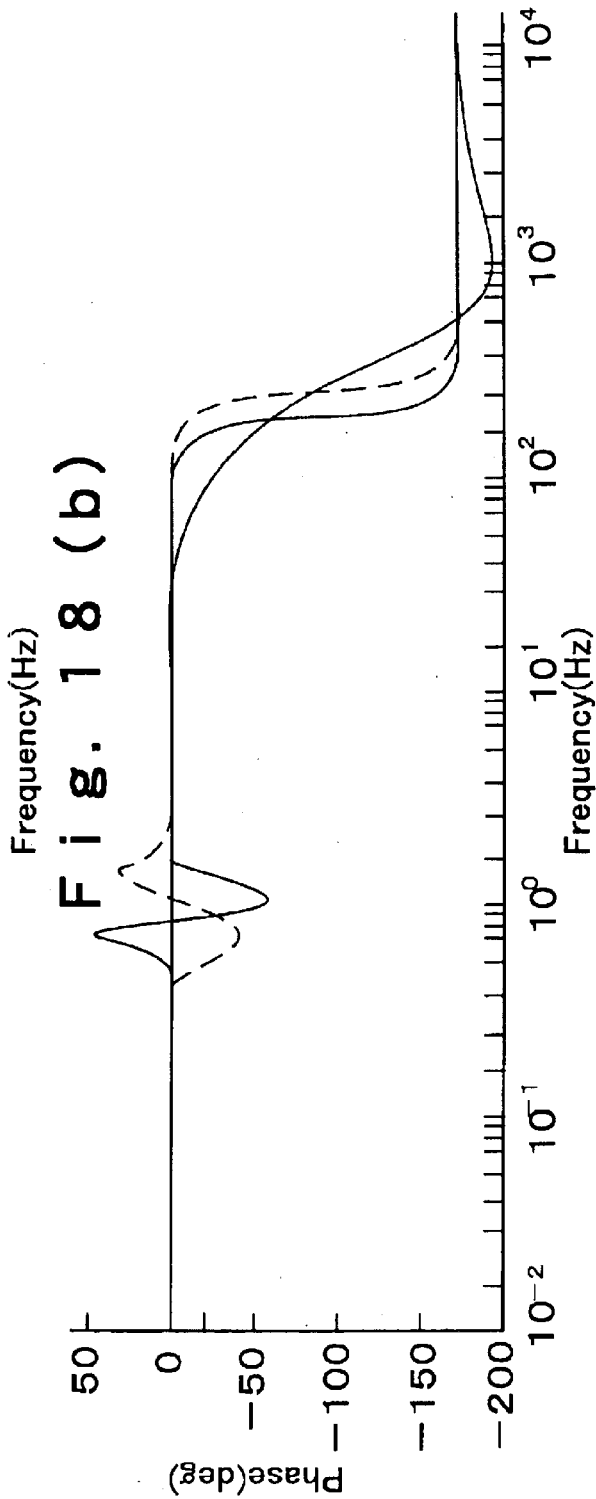
Fig. 18 (a)
Fig. 18 (b)

DIGITAL SIGNAL TO PULSE CONVERTER AND METHOD OF DIGITAL SIGNAL TO PULSE CONVERSION

CROSS REFERENCE TO RELATED APPLICATIONS

This application is based on and claims priority under 35 U.S.C. §119 with respect to Japanese Patent Application 2000-290703, filed on Sep. 25, 2000 and Japanese Patent Application 2001-183311, filed on Jun. 18, 2001, the entire contents of which are incorporated herein by reference.

FIELD OF THE INVENTION

This invention relates to a vibration reduction control apparatus for an electric motor and a design method of a vibration reduction control for the electric motor.

BACKGROUND OF THE INVENTION

Recently, an SR motor such as a motor for driving of an electric vehicle is known. When the SR motor is controlled, the SR motor is controlled so that a throttle opening degree based on an operating signal of an acceleration pedal is larger, and a target torque (an excitation current) is larger.

Conventionally, as shown in FIG. 16, the target torque is changed to a current instruction value I and an angle instruction value θ referring to a predetermined map MP when the target torque is given the SR motor 71 on a control of the SR motor 71. Hereupon, a battery voltage and motor rotational number are considered in a change (I and θ). The current instruction value I and the angle instruction value θ are given to a driving circuit 72, the SR motor 71 is controlled by these instruction values (I and θ).

However, if a control apparatus of the SR motor is an open loop, a torque fluctuation of the electric motor causes a resonance vibration for the SR motor or the vehicle body when a vehicle mounting on the SR motor has a resonance characteristic by an effect of a shaft, a twist of a tire, and a spring of a suspension, e.t.c. That is, as shown in FIGS. 18(a) and 18(b), when the target torque Req_trq suddenly changes by an operation of the accelerator pedal as shown in FIG. 18(b), the SR motor or the vehicle body vibrates by the torque fluctuation. The control apparatus has a stability characteristic reducing the vibration, when a step input of the vibration of the resonance frequency band happens during the torque fluctuation, a resonance phenomenon of which repeats the vibration many times. The vibration of the SR motor 71 caused by a resonance of the motor per se or a resonance of the vehicle body results in a rotational unevenness for a shaft of the SR motor 71. As the rotational unevenness gives little by little a load (a twist) to the shaft of the SR motor 71, there occurs a vibration for front and rear directions of the vehicle, which is unpleasant for crew of the vehicle.

To solve the abovementioned problem by a control of the microcomputer, a design of a high order controller is needed. If the abovementioned problem is solved by the design of the high order controller, the program becomes to complicate, the program cannot be stored in a predetermined program domain with restricted calculating time. On the other hand, when a low order controller is designed, it needs a coefficient to be set for each type of vehicle. Therefore, a lot of time is spent on a development for difference vehicles.

SUMMARY OF THE INVENTION

In view of the foregoing, it is an object of the present invention to provide a vibration reduction control apparatus for reducing the vibration for the electric motor by a simple control method.

It is another object of the present invention to provide a vibration reduction control apparatus and a design method of a vibration reduction control for an electric motor realizing a vibration reduction control adaptable to different vehicles.

According to a first aspect of the present invention, a vibration reduction control apparatus for an electric motor includes a detecting means for detecting a motor rotational number of the electric motor and outputting a motor rotational number signal based on the motor rotational number, a filter means for extracting a vibration signal of a predetermined frequency band from the motor rotational number signal, and a feedback control means for performing a correcting process for the vibration signal.

In this case, the filter means may comprise hardware or software. Further, the filter means for extracting the signal value of the predetermined frequency band from the motor rotational number signal has a function passing through the motor rotational number signal per se. The filter means may obtain the signal data of the predetermined frequency band by performing the predetermined filter calculation for the data obtained from the signal value of the motor rotational number signal.

According to the present invention, as the motor rotational number signal detected from the electric motor is passed through the filter means, the vibration signal of the predetermined frequency band such as the vibration reduction object of the electric motor is only extracted from the filter means. Then, the feedback control performing the predetermined correcting process is executed for the vibration signal value of the extracted predetermined frequency band. As a result of the feedback control, the vibration such as the vibration of the electric motor etc. is reduced.

According to a second aspect of the present invention, a vibration reduction control apparatus for an electric motor includes a detecting means for detecting a motor rotational number of the electric motor and outputting a motor rotational number signal based on the motor rotational number, a control means for outputting a torque control signal based on the motor rotational number signal and controlling the electric motor, a filter means for extracting a vibration signal of a predetermined frequency band including a frequency band of a disturbance vibration based on the motor rotational number signal detected by the detecting means, a correcting means for performing a predetermined correcting process which reduces a vibration of the vibration signal for the vibration signal of the predetermined frequency band extracted by the filter means and obtaining a corrected amount, wherein the control means performs an addition or a subtraction of the correct amount obtained from the correcting means for the torque control signal of the electric motor.

Thereby, only the vibration signal value of the predetermined frequency band including a frequency band of the disturbance vibration based on the motor rotational number signal detected by the detecting means is extracted by the filter means. Then, the corrected amount with reduced vibration is obtained as the predetermined correcting process is performed by the correcting means for the vibration signal value of the predetermined frequency band the extracted predetermined frequency band. The corrected amount is added or subtracted for the instruction value of the electric motor. As a result, the disturbance vibration such as the vibration of the electric motor is reduced.

According to a third aspect of the present invention, the predetermined frequency band includes at least a resonance frequency band of the electric motor or an assembled body with the electric motor, thereby making it possible to reduce the vibration of the electric motor causes by the vibration of the resonance frequency band of the electric motor or the assembled body with the electric motor, the resonance vibration per se.

According to a fourth aspect of the present invention, the electric motor is mounted on a vehicle body as a driving source of a vehicle, thereby making it possible to reduce the vibration of the electric motor or the resonance vibration of the electric motor per se, and making it possible to reduce the periodic fluctuation of a rotational speed of the electric motor causes by the vibration as the vibration of the electric motor transferred from the vehicle body or the resonance vibration the electric motor per se is depressed. Therefore, when the electric motor is used for the driving source of the vehicle, the vibration for the front and rear directions of the vehicle barely occur.

According to a fifth aspect of the present invention, the predetermined frequency band includes at least the resonance frequency band of a vehicle body with the electric motor. Thereby, the vibration toward the front and rear directions of the vehicle barely occur as the vibration of the resonance frequency is reduced when the vehicle body with the electric motor vibrates based on some vibration input, thereby the electric motor vibrates.

According to a sixth aspect of the present invention, the correcting process by the correcting means includes a PD control calculation, thereby making it possible to reduce effectively the vibration of the electric motor as the correcting process is the PD control calculation.

According to a seventh aspect of the present invention, a design method of a vibration reduction control for a electric motor includes an identification experiment step of performing an identification experiment for the electric motor, a model parameter identification step of calculating coefficients of a frequency transfer function based on an input signal and an output signal for the electric motor, a reference model establishing step of establishing a reference model, a correct coefficient calculating step of calculating a proportional gain and a differential gain of a controller so as to correspond with the reference model by using a model matching method, and a judging step of judging whether an apparatus including a controller fulfills a predetermined performance condition or not, wherein when the apparatus does not fulfill the performance condition, the proportional gain and the differential gain are repeatedly calculated by the correct coefficient calculating step until the apparatus fulfills the performance condition.

According to the present invention, the identification experiment is performed at the identification experiment step, the model parameter identification by the frequency fitting is performed at the model parameter identification step. Then, the reference model is established at the reference model establishing step, the coefficient of the correcting control by the model matching method is calculated at the correct coefficient calculating step. Next, the apparatus including the controller satisfies whether or not the predetermined performance condition is met at the judging step, when the apparatus including the controller does not satisfy the performance condition, the reference model is rebuilt, the coefficient on the correcting control is recalculated at the correct coefficient calculating step until the apparatus satisfies the performance condition at the reference model establishing step. According to the design method, the adequate coefficients due to the correcting control are determined.

Consequently, the high order controller is not need, the adjustment of the coefficient for each kind of the vehicle is easy.

According to an eighth aspect, the present invention further includes a discrete step of performing a discrete processing when the apparatus satisfies the performance condition by the judging step. Thereby, the performance condition is satisfied by the judging step, if the coefficient of the transfer function is determined, then the discrete processing, suitably the digital process, is performed on the discrete step. Therefore, the coefficients of the correcting control are set in the controller in a form befitted the digital control.

According to a ninth aspect of the present invention, a vibration reduction control apparatus for an electric motor includes a detecting means for detecting a motor rotational number of the electric motor, a control means for outputting a torque control signal based on the motor rotational number for the electric motor, and a controller for suppressing effect by characteristic fluctuation of a control system based on the motor rotational number, and obtaining a corrected amount compensating sensibility characteristic when the characteristic fluctuation happens, wherein the controller performs an addition or a subtraction of the corrected amount obtained from the controller for the torque control signal of the electric motor.

Thereby, as the corrected amount obtained from the controller is modified by an addition or a subtraction for the instruction value of the electric motor, effect by the characteristic fluctuation of the control system can be suppressed, the Robust stability on the control system can be secured, the sensibility characteristic when the characteristic fluctuation happens on the control system can be approximately compensated, i.e. the vibration reduction and the torque tracking performance can be compensated. Accordingly, when the characteristic fluctuation on the control system, the vibration of the electric motor is suppressed suitably, the torque tracking performance is secured suitably, too.

Further, as the robust stability is secured and the sensibility characteristic for the characteristic fluctuation is compensated using a single controller, man time for adjusting the controller can be reduced or omitted and parts (microcomputer or controller) can be used in common.

According to a tenth aspect of the present invention, the characteristic fluctuation of the control system includes at least one of difference in driving condition, electric motor type, assembled body assembled with the electric motor, torque ripple, sensor noise, and a steady component of the motor rotational number.

Thereby, the sensibility characteristic can be compensated for the characteristic fluctuation of at least one of difference in driving condition, electric motor type, assembled body assembled with the electric motor, torque ripple, sensor noise, and a steady component of the motor rotational number.

According to an eleventh aspect of the present invention, a design method of a vibration reduction control for an electric motor includes a controller for obtaining a corrected amount performing an addition or a subtraction for an instruction value on the torque control of the electric motor based on a motor rotational number includes an express means for expressing by a generalized plant on H∞ control problem including characteristic fluctuation and sensibility characteristic of a control system for a transfer function of the controller, a deal means for dealing a model error corresponding to the characteristic fluctuation and a virtual model error corresponding to a fluctuation of the sensibility characteristic as a structural fluctuation dependently, and a derive means for adding a scaling matrix with scaling parameter corresponding to each structural fluctuation to the generalized plant, for deriving the scaling matrix and the controller so as to minimize a H∞ norm of the generalized plant as a H∞ control problem with constant scaling matrix.

According to a twelfth aspect of the present invention, a design method of a vibration reduction control for a electric motor includes Step 1: set a scale parameter d to a predetermined standard value, calculate the controller K(s) by γ-repeat method as H∞ control problem, memorize a H∞ norm of the generalized plant corresponding to a scaling parameter d at that time, Step 2: calculate the controller by gradually changing from the standard value for the scaling parameter d, memorize H∞ norm of the generalized plant corresponding to the scaling parameter d at that time, Step 3: calculate a local minimum value regarding H∞ norm of the generalized plant as a function f(d) for the scaling parameter d, establish a scaling matrix D by a value of the scaling parameter d at that time, and Step 4: calculate the controller K(s) by γ-repeat method using the value of the scaling parameter d giving local minimum value of function f(d), regards the controller K(s) as an optimum solution, wherein the optimum solution of the H∞ control problem with constant scaling matrix is calculated according to each steps.

Thereby, the controller is derived so as to be suitably balanced to suppress effect of the characteristic fluctuation of the control system, and to compensate the sensibility characteristic when the characteristic fluctuation happens. Accordingly, the corrected amount obtained by the derived controller is added to or subtracted from the instruction value of the electric motor, effect by the characteristic fluctuation on the control system can be suppressed, the robust stability on the control system can be secured, the sensibility characteristic (the vibration reduction and the torque tracking performance) can be approximately compensated when the characteristic fluctuation happens. Accordingly, when the characteristic fluctuation happens on the control system, the vibration of the electric motor can be suppressed suitably, the torque tracking performance can be secured suitably.

Further, man time for adjusting the controller can be reduced or omitted and parts (microcomputer or controller) can be used in common by the ensure of the Robust stability and the compensation of the sensibility characteristic for the characteristic fluctuation by using the single controller.

BRIEF DESCRIPTION OF THE DRAWINGS

The features and advantages of a vibration reduction control apparatus for an electric motor and a design method of the vibration reduction control for the electric motor according to the present invention, and others, will be more clearly appreciated from the following description considered in conjunction with the accompanying drawing figures in which like elements bear like reference numerals and wherein:

FIGS. 17(a) and 17(b) are graphs for explaining a generated vibration of the electric motor when the target torque changes.

FIGS. 18(a) and 18(b) are graphs for explaining a frequency characteristic of the electric motor when the torque changes.

DETAILED DESCRIPTION OF THE INVENTION

Figure 1:
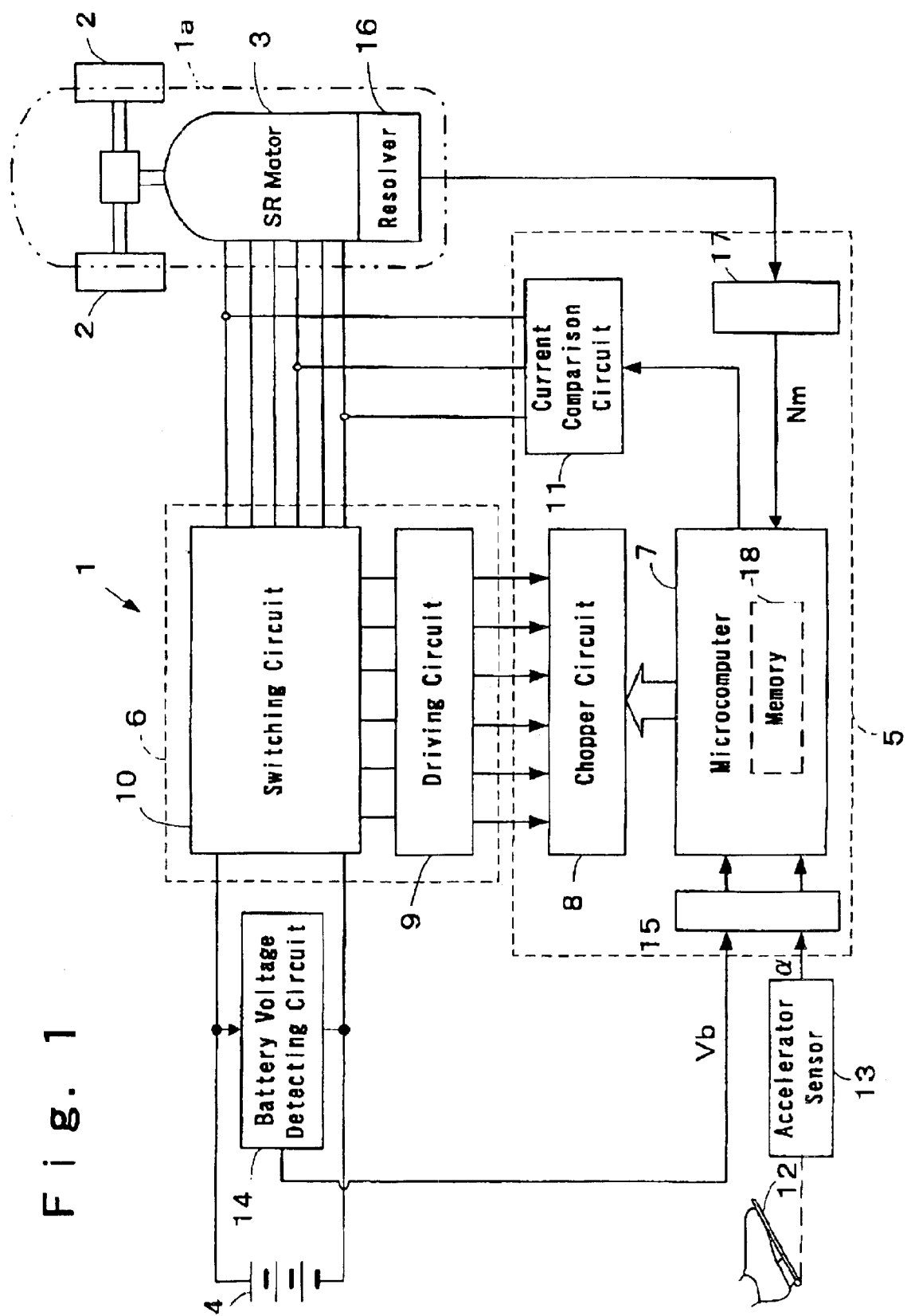
FIG. 1 is a schematic block diagram of an electric vehicle according to a first embodiment of a present invention.

Hereinafter, preferred embodiments of the present invention will be described referring to FIGS. 1–7. FIG. 1 shows a block diagram of a power train system of an electric vehicle according to an embodiment of the present invention.

(First Embodiment)

The electric vehicle 1 includes an SR (Switched Reluctance) motor 3 such as an electric motor of the power train source outputting a driving torque at a driving wheel 2. The SR motor 3 is mounted on a predetermined location of a part room of a vehicle body 1a in the electric vehicle 1. However, FIG. 1 only shows the location of the SR motor in the vehicle body 1a, a size of the SR motor shown in FIG. 1 is not to scale. A battery 4 is used e.g. a fuel electric battery or rechargeable battery, etc. The SR motor 3 is controlled by an ECU (Electronic Control Unit) 5 via an inverter 6. The ECU 5 comprises a microcomputer 7 and a chopper circuit 8. Further, the microcomputer 7 includes a filter means, a correcting means, and a control means.

The inverter 6 connects to the battery 4 supplying a battery voltage, an output side of the inverter 6 electrically connects to the SR motor 3. The inverter 6 comprises a driving circuit 9 and a switching circuit 10. The SR motor 3 is controlled based on a signal inputted the switching circuit 10 via the driving circuit 9 from the chopper circuit 8 that the chopper circuit 8 is controlled by a chopper control based on a instruction signal (e.g. target torque signal) from the microcomputer 7.

The SR motor 3 consists of three-phased motor, the SR motor 3 is controlled by a control of an excitation timing for three phase coils (not shown). The inverter 6 supplies an excitation current to each of the three phase coils of the SR motor 3, the inverter 6 has three pair wires (that is, six electric wires), each wire connects to three phase coils in the SR motor 3 so as to supply a excitation current. A current comparison circuit 11 detects a current value flowing the electric wire. The chopper circuit 8 corrects a instruction value which transmits the driving circuit 9 based on a current detecting signal inputted from the current comparison circuit 11.

The microcomputer 7 receives as input an accelerator signal (throttle opening degree α) from the accelerator sensor 13 for detecting an operating amount of an accelerator pedal 12, a battery voltage detecting signal (battery voltage Vb) from a battery voltage detecting circuit 14 via an interface 15 respectively. Further, the microcomputer 7 received as input a rotational detecting signal (motor rotational number Nm) from a resolver 16 such as the detecting means for detecting a rotation of the SR motor 3 via a interface 17.

Figure 3:
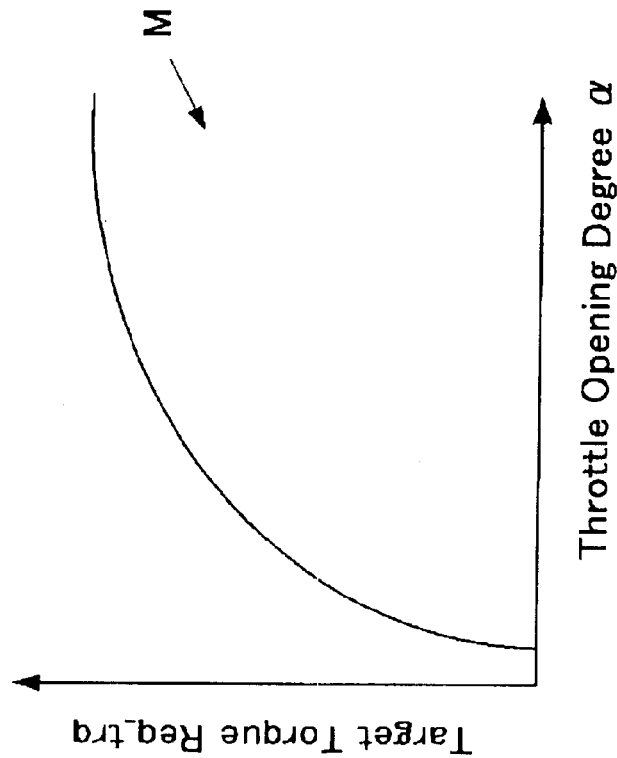
FIG. 3 is a map for obtaining a target torque from a throttle opening degree according to the first embodiment of the present invention.

The microcomputer 7 memorizes a map M shown in FIG. 3 in a memory 18, the microcomputer 7 finds out a target torque Req_trq referring to the map M based on the throttle opening degree α detected by the accelerator sensor 13. In this embodiment, this target torque Req_trq corresponds with a target value for controlling the SR motor 3. Further, the microcomputer 7 calculates the battery voltage value Vb detected by the battery voltage detecting circuit 14, and the microcomputer 7 calculates the motor rotational number Nm based on the rotational detecting signal from the resolver. The memory 18 memorizes two maps (three dimensional map) which calculate individually a current instruction value I, an energization angle (angle instruction value) θ based on three parameter of the torque instruction value trq(n), the motor rotational Nm, and the battery voltage Vb. The torque instruction value trq(n) corresponds to an instruction value for a control regarding the target torque Req_trq as a target value. Using the target torque Req_trq and a time constant T of the filter, the torque instruction value trq(n) is calculated as follows:

$$trq(n)=(T \cdot trq(n-1)+Req\_trq)/(T+1) \quad (1)$$

The microcomputer 7 outputs the instruction signal comprising the current instruction value I based on the three parameter of trq(n), Nm, and Vb and the angle instruction value θ for the chopper circuit 8. The chopper circuit 8 outputs the instruction signal which energizing three phase coils in turn at a predetermined excitation timing in response to the angle instruction value θ based on the instruction signal (e.g. I, θ) from the microcomputer 7 to the switching circuit 10 via the driving circuit 9.

Figure 2:
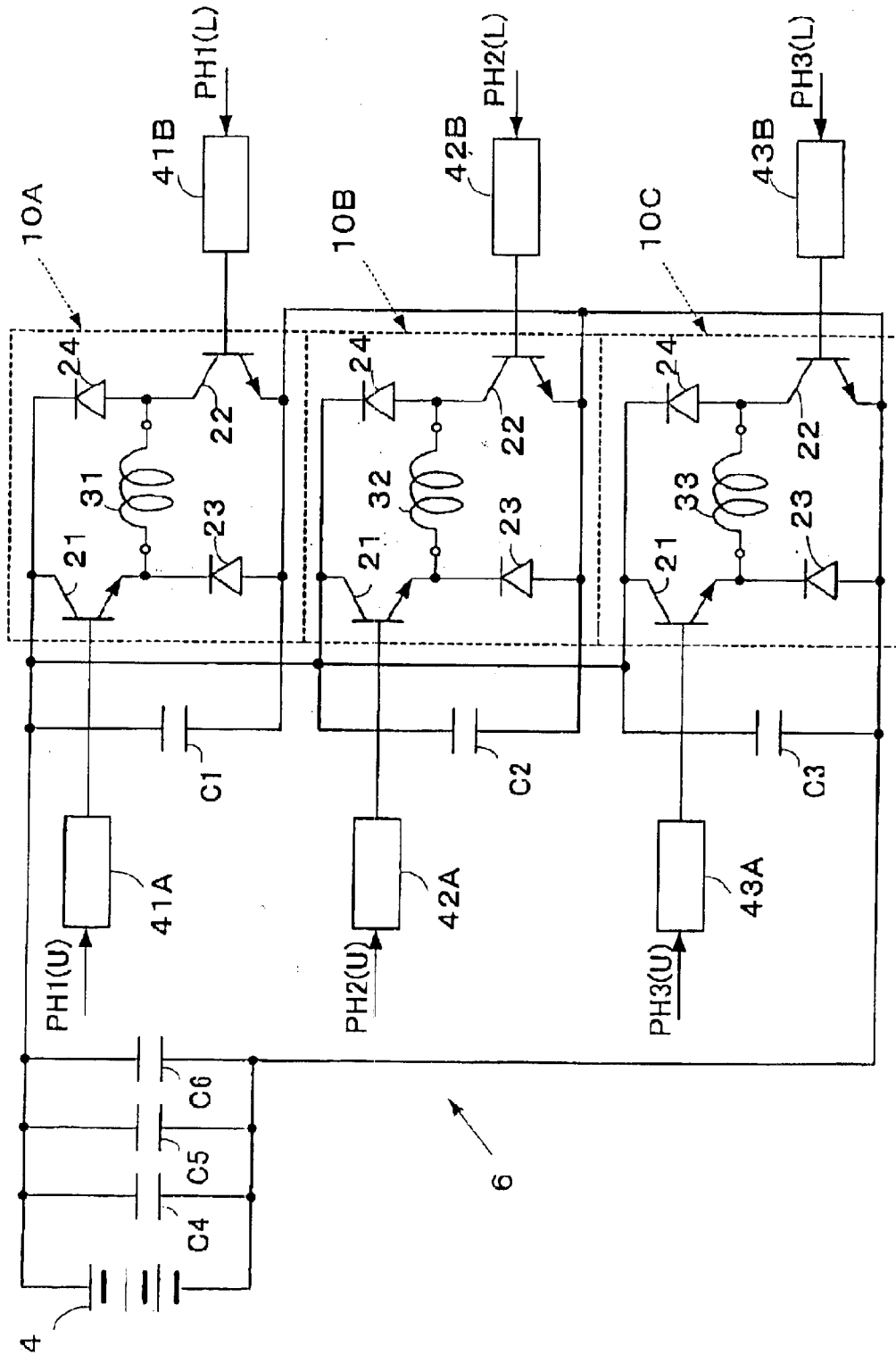
FIG. 2 is an electric circuit diagram of an inverter shown in FIG. 1.

FIG. 2 shows a electric circuit diagram of the inverter 6. The inverter 6 comprises three switching circuits 10A, 10B, and 10C corresponding with the motor coils (three phase coils) 31,32,33 of three phases (phase 1, phase 2, and phase 3) respectively. The switching circuit 10 comprises the above-mentioned three circuits 10A, 10B, and 10C. Each of the switching circuit 10A, 10B, and 10C is supplied to a battery voltage from the battery 4. Each of the switching circuit 10A, 10B, and 10C includes two switching elements (transistor) 21, 22, and two diodes 23, 24 at both sides of the motor coils 31, 32, and 33.

Each gate of two switching elements 21, 22 on the each phase connects to a driving circuit 41A, 41B on the phase 1, a driving circuit 42A, 42B on the phase 2, and a driving circuit 43A, 43B on the phase 3 for outputting a voltage signal respectively. The driving circuit 9 comprises a pair of the driving circuit 41A, 41B, 42A, 42B, 43A, 43B. Further, each of the switching circuits 10A, 10B, and 10C connects to each condenser C1, C2, and C3 in parallel, three condensers C4, C5, and C6 are connected to the battery 4 in parallel.

Each gate of the switching elements 21, 22 on the three phases is inputted a PWM signal. A duty ration of the PWM signal depends on the current instruction value I generated by the chopper circuit 8. The PWM signal is inputted at the gate of the switching elements 21, 22 respectively at the excitation timing according to the angle instruction value θ, thereby it energizes the motor coils 31, 32, and 33 in turn. Therefore, the motor current according to the current instruction value I is energized at the excitation timing according to the angle instruction value θ.

A torque value (that is, a throttle opening degree α) T while the motor torque is zero during a rotation by inertia is necessarily determined according to the motor rotational number Nm. The memory 18 memorizes the map (not shown) so as to calculate a standard torque value T0 corresponding to the torque instruction value which is zero torque (an inertia rotation) from the motor rotational number Nm. The microcomputer 7 detects a rotational direction of the electric motor based on the rotational detecting signal of the resolver 16. The microcomputer 7 judges that a motoring when the microcomputer 7 outputs a torque of a same direction as the motor rotational direction or a regeneration when the microcomputer 7 outputs a torque of a reverse direction for the motor rotational direction. The microcomputer 7 judges that a motor rotational condition is the motoring when a present torque instruction value trq(n−1) is greater than the standard torque value T0 and the motor rotational condition is the regeneration when the present torque instruction value trq(n−1) is less than the standard torque value T0.

When the motor rotational condition is the regeneration, the microcomputer 7 energizes motor coils 31, 32, 33 of each phase by an order of the energization timing generating a torque of a reverse direction differs from the motor rotational direction calculated based on the rotational detecting signal of the resolver 16, and the microcomputer 7 controls the SR motor 3 so as to generate a reverse torque. Further, when the motor rotational condition is the motoring, the microcomputer 7 energizes motor coils 31, 32, and 33 of each phase by an order of the energization timing generating a torque of a direction corresponding with the motor rotational direction calculated based on the rotational detecting signal of the resolver 16, and the microcomputer 7 controls the SR motor 3 so as to generate a normal torque. As a result, a torque according to the torque instruction value trq(n) is generated on the SR motor 3, at this time, the energization timing (excitation timing) is determined by the angle instruction value.

Figure 4:
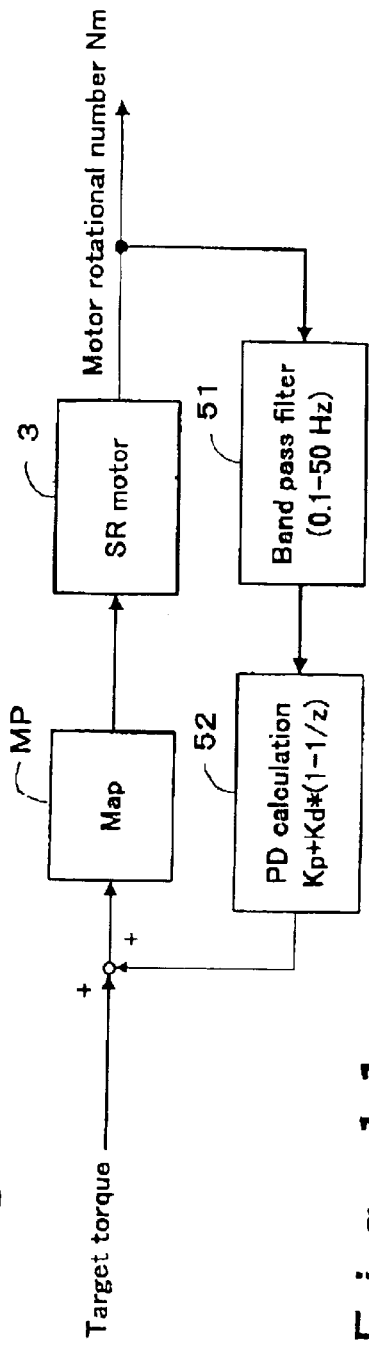
FIG. 4 is a control block diagram of a vibration reduction control according to the first embodiment of the present invention.

FIG. 4 shows a block diagram of a control adopted in this embodiment. A torque control of the SR motor 3 performs a feed forward control (an open loop control). The SR motor 3 adopts a vibration reduction control so as to reduce a low frequency vibration (resonance vibration) of the SR motor 3. A summary of the vibration reduction control is following:

A step input of a vibration of a resonance frequency band by a torque fluctuation when the accelerator pedal 12 is operated or not causes a resonance phenomenon of which the vibration continues many times. The vibration of the electric motor based on a resonance of the motor per se, or a resonance of the vehicle body 1a gives a little by little load on a normal or reverse rotations for a shaft of the electric motor, thereby it causes a rotational unevenness on the shaft of the electric motor. The motor vibration reduction control reduces the rotational unevenness by way of reducing the motor vibration as small as possible. Only a frequency of a resonance band is extracted by the filter so as to reduce the resonance vibration to be as small as possible, the vibration of the extracted frequency is reduced to be as small as possible by a PD control.

The band pass filter 51 passes through a frequency component which is a vicinity of a resonance frequency (e.g. 0.1–50 Hz). After the motor rotational number is detected, the motor rotational number signal is passed through the band pass filter 51. The band pass filter 51 removes a normal condition component of the motor rotational number and a detecting noise. In this embodiment, as the resonance frequency of the SR motor 3 is 5 7 Hz, a frequency band of the band pass filter is set at 0.1 to 50 Hz so as to pass the resonance frequency band(5 7 Hz). The band pass filter 51 is adopted to be a digital filter consisting of a software in this embodiment. A frequency, component of which is near a resonance point of the motor rotational number, is inputted in the band pass filter 51. The band pass filter 51 comprises the filter means.

A PD calculating portion 52 performs a PD calculating process which the vibration is higher reduced for a signal value (signal data) of a vibration rebel of the frequency component (0.1–50 Hz) which is near at the resonance point extracted through the band pass filter 51. That is, the PD calculating portion 52 corrects the target torque (instruction value) based on the extracted frequency component of a vicinity of the resonance point (0.1 50 Hz). A PD calculation formula (frequency transfer function) is as follows:

$$Kp + Kd \cdot (1 - 1/z)$$

Kp: proportional gain (P gain)
Kd: differential gain (D gain)
1/z: delay element A PD calculation is performed for the motor rotational number after the band pass filter process, a PD_out (corrected amount) is calculated by the PD calculation. Then the PD_out is subtracted from the target torque Rrq_trq. Thus, a loop of which the motor rotational number is a feedbacke is established. The proportional gain Kp and the differential gain Kd which is constant of the PD control is set as a value so as to reduce a resonance characteristic of the SR motor 3. A design method determining these constants (Kp, Kd) will be explain hereinafter. Further, even if a sign of the proportional gain Kp and the differential gain Kd are turned over, a calculation result of the PD control is added to the target torque, the result is the same.

The current instruction value I and the angle instruction value θ are obtained by the map Mp including two map (three dimensional map) based on three parameters of the torque instruction value trq(n), the motor rotational number Nm, and the battery voltage Vb. In this case, the torque instruction value trq(n) is determined by applying the "Tn+PD_out" (correspond with Req_trq) to "Req_trq" of the formula (1). The current instruction value I and the angle instruction value θ gained by the map M (the above mentioned two map which is three dimension map) based on three parameters (the torque instruction value trq(n), the motor rotational number Nm, and the battery voltage Vb) are send to the SR motor 3 from the microcomputer 7 via the chopper circuit 8, the driving circuit 9, and the switching circuit 10. Further, the motor rotational number Nm of the SR motor 3 is detected by the resolver 16, the detected motor rotational number Nm is given to the band pass filter 51, thereby the feedback loop concerning to the vibration reduction control is built.

Figure 6:
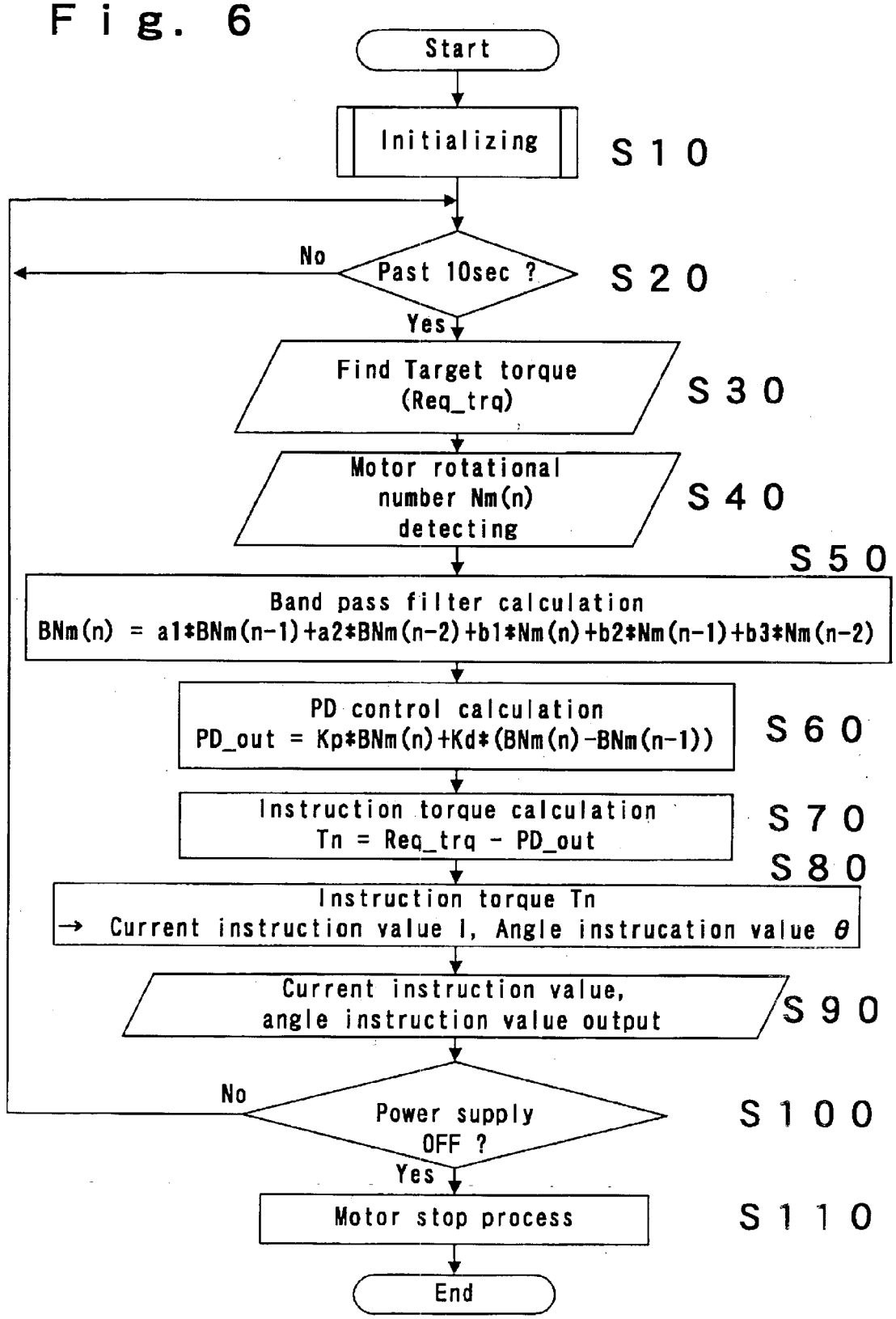
FIG. 6 is a main flowchart of the vibration reduction control for the electric motor according to the first embodiment of the present invention.

A control of the block diagram as shown in FIG. 4 is performed by software. The memory 18 in the microcomputer 7 memorizes a flow chart of a program of a vibration reduction control for the electric motor as shown in FIG. 6. The flowchart will be explained hereinafter.

At step 10 (hereinafter step will be simply referred to as S), an initialization is performed. At S20, the microcomputer 7 judges whether a time is past 10 msec from the latest control or not. That is, the microcomputer 7 judges whether the time interval of the control is past 10 msec.

At S30, the microcomputer 7 obtains the target torque Req_trq. That is, the microcomputer 7 reads the throttle opening degree α, the target torque Req_trq is obtained referring to the map M (shown in FIG. 3) based on the throttle opening degree α.

At S40, the microcomputer 7 detects the motor rotational number Nm(n). Hereupon, Nm(n) is showing a sampling value which is n times, Nm(n) is a present detecting value of the motor rotational number, Nm(n 1) is a latest detecting value thereof.

At S50, the microcomputer 7 executes a band pass filter calculating process. That is, an output value BNm(n) of the band pass filter 51 is calculated by using the following formula.

$$BNm(n) = a1 \cdot BNm(n-1) + a2\ BNm(n-2) + b1 \cdot Nm(n) + b2 \cdot Nm(n-1) + b3\ Nm(n-2)$$

Hereupon, BNm(n) is a calculated value of $n^{th}$ sampling, BNm(n) is a present calculated value, BNm(n−1) is a latest calculated value.

At S60, the microcomputer 7 executes the PD control calculation process. That is, the microcomputer 7 calculates the PD control calculated value PD_out by using a following formula.

$$PD\_out = Kp \cdot BNm(n) + Kd \cdot (BNm(n) - BNm(n-1))$$

Kp: proportional gain  Kd: differential gain

At S70, the microcomputer 7 calculates the instruction torque Tn for the electric motor. That is, the instruction torque Tn is calculated by using a formula (Tn=Req_trq−PD_out).

At S80, the instruction torque Tn is changed to the current instruction value I and the angle instruction value θ for the electric motor. A transformed formula "Tn+PD_out" (=Req_trq) is applied to "Req_trq" in the formula (1), thereby the torque instruction value trq(n) is calculated. Referring to individually map which corresponds to the map M shown in FIG. 4 based on the torque instruction value trq(n), the motor rotational number Nm(n), and the battery voltage Vb, the current instruction value I and the angle instruction value θ are determined by the map M respectively.

At S90, the microcomputer 7 outputs the current instruction value I and the angle instruction value θ to the chopper circuit 8. The chopper circuit 8 controls the switching circuit 10 by the PWM control via the driving circuit 9 at the energization timing based on the angle instruction value θ. As a result, each of the motor coils 31, 32, and 33 is excited at the predetermined energization timing.

At S100, the microcomputer 7 judges whether a power supply is cut (an OFF condition ) or not. The program returns to S20 while the power supply is an ON condition, the program continues S20–S100. However, as soon as the power supply changes an OFF condition, the program executes a stop process of the electric motor at S110.

Figure 5:
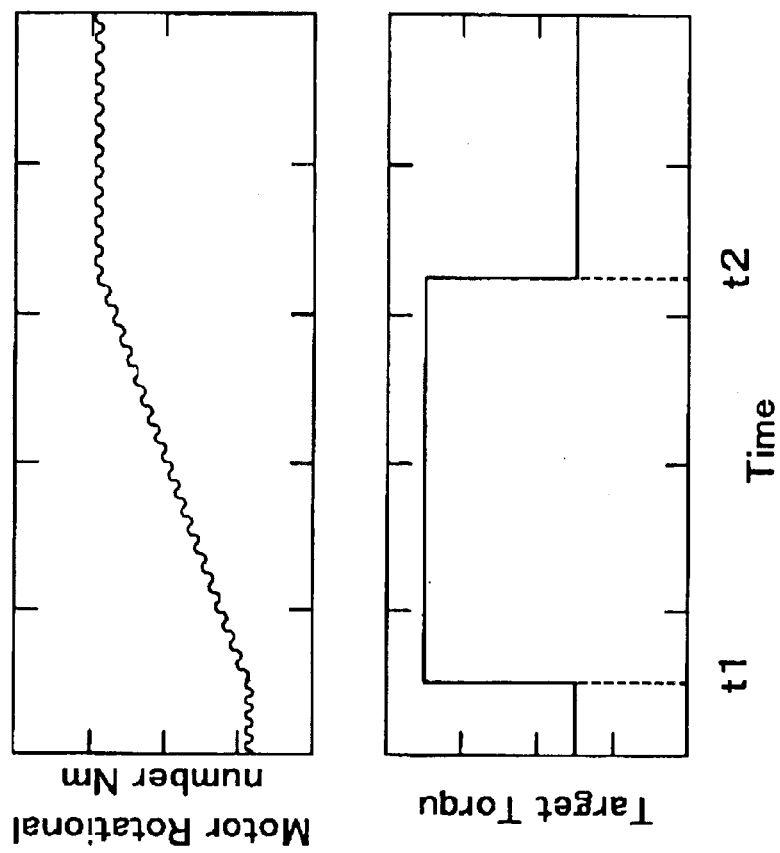
FIG. 5 is a graph for explaining effect of the vibration reduction when a torque is fluctuating according to the first embodiment of the present invention.

When the electric vehicle 1 is running, comparably large variation of an accelerator operation occurs the resonance vibration e.t.c. of the vehicle body 1a. The resonance vibration transmits to the SR motor 3, The resonance vibration is extracted as an output value BNm(n) of the band pass filter through the band pass filter 51. Next, the PD control calculation is performed based on the extracted BNm(n), thereby a PD_out of the PD control calculation value as a correct value which reduce the resonance vibration is calculated. Then, the target torque Req_trq is corrected by using the PD control calculated value PD_out. As the current instruction value I and the angle instruction value θ based on the corrected instruction torque Tn are determined, the SR motor 3 is controlled by the current instruction value I and the angle instruction value θ, the vibration of which transmits to the SR motor 3 is declined and reduced. For example, as shown in FIG. 5, when a drastically increase of the target torque Req_trq by an opening operation of the throttle opening degree α at time t1 or a drastically decrease of the target torque Req_trq by a closing operation of the throttle opening degree α at time t2 is happens, the torque fluctuation is triggered, if the vehicle body 1a vibrates at the resonance frequency, the motor rotational number Nm is not effected by the vibration of the frequency band based on the resonance vibration as the vibration transmitted to the SR motor 3 is reduced. Thereby, as if the resonance frequency transmits to the shaft of the SR motor 3, the little by little vibration of the vehicle body 1a is not nearly happen as the rotational unevenness causes by the vibration is prevented.

Next, the above mentioned control program, a design method of which determines the proportional gain Kp and the differential Kd in the PD control calculation will be explained hereinafter.

In this design method of this embodiment, a resonance characteristic of the SR motor 3 on a frequency region is expressed by a high order transfer function (vibration model), the resonance characteristic is set so as to correspond with an input and output characteristics of the SR motor 3. A reference model of which satisfies with a condition reducing the resonance peek is constructed for the gained vibration model. Further, on the design of the PD control, a model matching method is adopted. The model matching method is a design method that a controller is designed so as to correspond a transfer function of the close loop with the transfer function of the reference model if the transfer function is given. That is, concerning to the model matching method, when a close loop of which includes a proportional term (P term) and a differential term (D term) in the feedback control is constructed, the proportional gain and the differential gain are calculated so as to correspond a frequency characteristic of the close loop with a frequency characteristic of the reference model.

A detail of this design method will be explained hereinafter referring to a flowchart in FIG. 7.

At S210, an identification experiment is performed. That is, the SR motor 3 is mounted on the vehicle body 1a, a vibration characteristic is actually surveyed. For example, a test signal (0 20 Hz) is given to the SR motor 3, the rotational number of the SR motor 3 is detected, an input and output characteristic of the SR motor 3 is examined.

At S220, a model parameter identification is held by a frequency fitting. Hereupon, the model parameter identification means that a coefficient of the frequency transfer function is determined. A Bode diagram is created from the input and output characteristic of the SR motor 3, a mathematical formula corresponding with the Bode diagram is sought by seeking a coefficient of which corresponds with the Bode diagram. The model parameter identification regards the mathematical formula model as the transfer function of the frequency characteristic.

At S230, the reference model is derived. An ideal model for reduced vibration is set such as the reference model. That is, as the identification model is shown as a mathematical model, what term of the mathematical model is the most effective term for the resonance characteristic is found by analyzing the mathematical model. Thereby, it is analytically able to obtain a reference model without resonance characteristic by using the mathematical model.

At S240, the PD control calculation by the model matching method is executed. The proportional gain and the differential gain are determined so as to correspond with the reference model when the proportional term (P term) and the differential term (D term) enter in the feedback control.

At S250, a controller of the model matching method judges whether the transfer function satisfies with a predetermined performance estimating condition or not. When the transfer function does not satisfy with the performance estimating condition, the program returns to S230. At S230, another reference model is rebuilt, the program repeats a process at S230 S250 until the transfer function satisfies with the performance estimating condition at S250. Then, the program proceeds to S260 when the transfer function satisfies with the performance estimating condition.

At S260, a discrete process of the controller is executed. That is, the design is executed on a continuously time. However, as the software is installed in the microcomputer (controller) 7, a discrete process for changing an analog value to a digital value is executed. Further, a program including the gained data (P gain and D gain)obtained by discrete process is installed in the microcomputer 7.

According to the present embodiment as above-mentioned, effects are as follows.

The predetermined frequency band including at least a vibration which comes to a disturbance of the SR motor 3 such as a resonance frequency of the vehicle body 1a or the resonance frequency of the SR motor 3, etc. through the band pass filter 51 from the motor rotational number is taken out, the feedback control including the PD control based on the vibration of the predetermined frequency band is performed. Therefore, though the SR motor 3 vibrates by a resonance vibration from the vehicle body 1a, the shaft of the SR motor 3 is controlled so as to reduce the rotational unevenness based on the vibration, the little by little vibration toward a front direction or a rear direction of the vehicle body 1a does not occur. Therefore, it is comfortable to ride in the electric vehicle 1.

As the PD control, as a control reducing the vibration, adopts, the vibration is reduced effectively, thereby it is comfortable to ride on the electric vehicle 1.

As the band pass filter 51 is constructed by a software as the digital filter, the vibration reduction control program is only added in a software installed in the micro computer 7. Thereby, the control and a design change is easily implemented.

The suitable gains (the proportional gain and the differential gain) using in the PD control calculation on the vibration reduction control are obtained by the design method using the model matching method, making possible it to reduce man hours of design.

(Second Embodiment)

A second embodiment will be explained hereinafter referring to FIGS. 8–15. The second embodiment differs from the first embodiment in that it adopts an H∞ (H infinity) control such as the vibration reduction control in the feed back control. Portions of the explanation which are the same as the first embodiment are omitted in the explanation of the second embodiment.

Generally, a controller for reducing effect for a characteristic fluctuation of a control system by an H∞ control theory is designed, i.e. the controller can be secured, with a robust stability. In a standard H∞ control problem which addresses a robust stability problem (securement of the robust stability), a sensibility characteristic of the control system (a vibration reduction and a torque tracking performance) is assured for a nominal plant. On the other hand, the sensibility characteristic is conservative, it often causes a large languish when a characteristic of the plant (control system) fluctuates and a model error occurs. For example, as gain becomes large at an anti-resonance point shown in FIG. 18 by a sudden change of the target torque shown in FIG. 17, a vibration on the SR motor happens at a frequency of the anti-resonance point. In other words, the robust stability can be secured, but the sensibility characteristic is depressed, it causes the vibration of the electric motor.

In the second embodiment, the sensibility characteristic at a characteristic fluctuation time of the control system results in the robust performance problem, the controller for reducing the vibration such as the H∞ control problem with constant scaling matrix which treated as a structured fluctuation includes the sensibility characteristic and the characteristic fluctuation of the plant is designed. A high-performance control system whose performance is not deteriorate for the sensibility characteristic realized by the derived controller as this like even if the characteristic fluctuation happens.

A design method of the controller K according to the H∞ control will be explained hereinafter. The controller K is designed by solving the H∞ control problem based on a block diagram shown in FIG. 8. With respect to the H∞ control problem, a generalized plant includes an exogenous input w, a controlled input u, a controlled output z, and a motor rotational number (observed amount) Nm, the H∞ control problem determines the controller K which H∞ norm ($\|tzw\|\infty$) for a transfer function Tzw from the exogenous input w to the controlled output z is less than the predetermined value (e.g. "1"). The design method of the controller K will be explained step by step hereinafter.

[Determination of Real Model]

A real model Psys is determined from the actual motor rotational number Nm for the target torque w1 when the SR motor 3 is driven on the open loop system. That is, the target torque w1 is given to the open loop system, a current instruction value I and an angle instruction value θ are determined by the map MP. The SR motor 3 is actually driven via the chopper circuit 8, the driving circuit 9, and the switching circuit 10 based on the current instruction value I and the angle instruction value θ. The actual motor rotational number Nm of the SR motor 3 for the target torque w1 is measured, the real model Psys is determined by the measured result (i.e. an actual response Nm for the target torque w1) as shown in FIGS. 9(a) and 9(b). this determination of the real model Psys is performed based on the method called model parameter identification by an identification experiment and an frequency fitting.

[Reference Model Derivation]

Referring to the gained real model Psys, an ideal model with the vibration reduction and the toque tracking performance for a change of the target torque w1 is delived and created such as the reference model Rsys. The reference model Rsys includes a gain less than a gain of the real model Psys at a vicinity of a resonance frequency, at another frequency band, the reference model Rsys is created so as to equip a gain corresponding with the gain of the real model Psys (referring to FIGS. 9(a) and 9(b)).

At a stage which ends in a determination of the real model Psys and a derivation of the reference model Rsys, the closed loop is established by the real model Psys and the controller K, a system which connects the real model Psys to the reference model Rsys in parallel is established. Then, the target torque w1 is changed to the instruction torque via the weighting function ws, the instruction torque is inputted in the real model Psys and the reference model Rsys, a deviation (difference in the motor rotational number) between an output of the reference model Rsys and an output of the real model Psys is outputted as the controlled output z1.

Thereby, a problem for obtaining a controller K approaching a response of the real model Psys to a response of the reference model Rsys can be determined from the H∞ control problem for obtaining the controller K of which H∞-norm for the transfer function Tz1w1 from the target torque w1 to the controlled output z1 is less than a predetermined value γ($\|Tz1w1\|\gamma$). Thereby, the sensibility characteristic (the vibration reduction and the torque tracking performance) of the control system can be estimated at the same time.

On the generalized plant, a transfer characteristic from the target torque w1 to the controlled output z1 as follows:

[formula 1]

[formula 2]

[formula 3]

On the creation of the generalized plant, the real model Psys approaches the reference model Rsys so that the predetermined value γ is small. Formula 2 is a nominal performance condition, thereby the sensibility characteristic for the nominal model is considered.

By the way, on the control system, if a weighting function ws is set so as to be large at a predetermined frequency band, the controller K whose real response at the predetermined frequency band, approaching more the response of the reference model Rsys, can be obtained. For example, if a gain of the weighing function ws is set so as to be large at a low frequency band, the actual response at the low frequency band approaches the reference model, thereby, the vibration reduction and the torque tracking performance of the SR motor 3 can be improved.

[Deviation of Characteristic Fluctuation/Set of Weighting Function]

Figure 8:
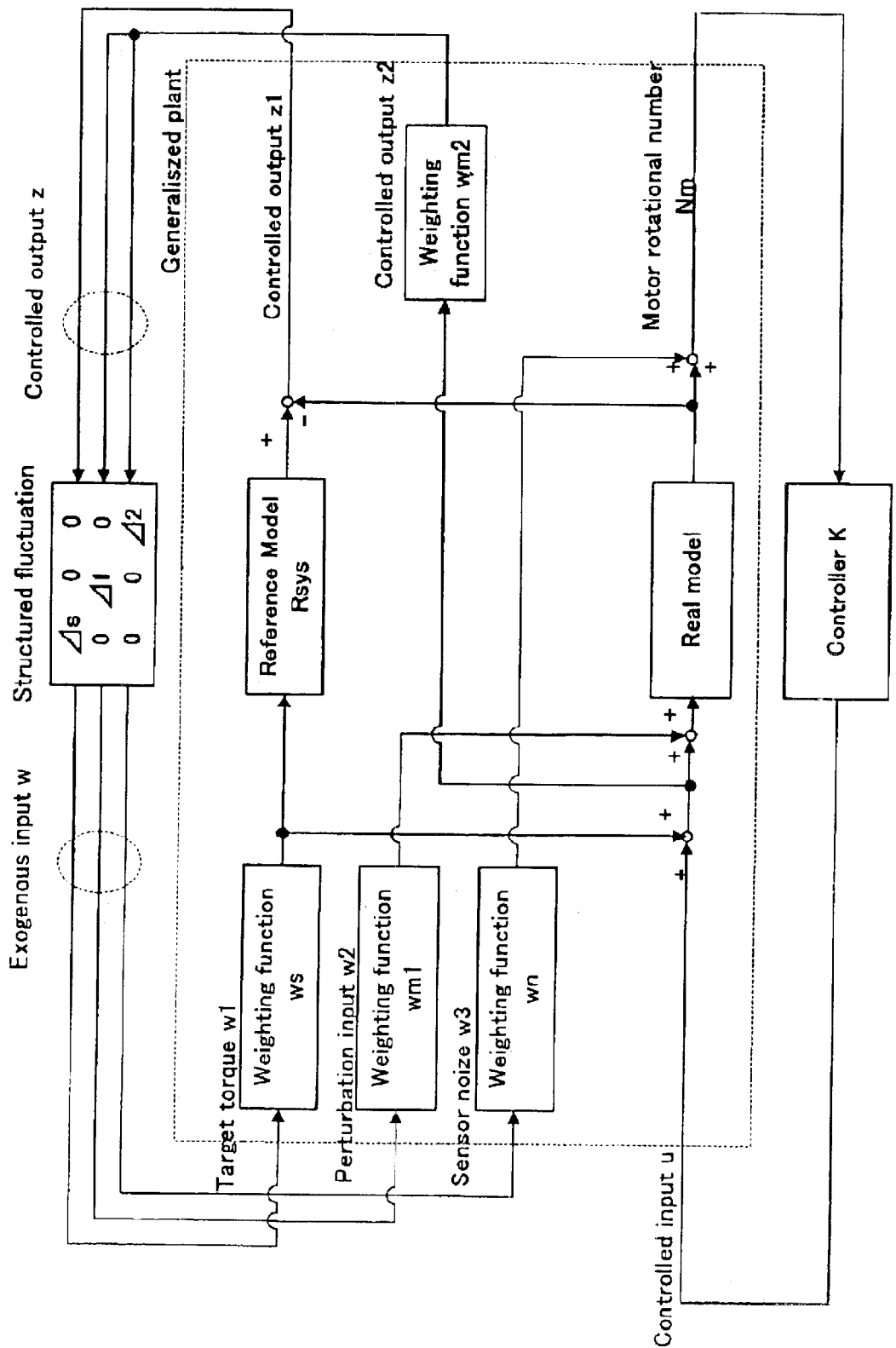
FIG. 8 is a block diagram for determining the controller by H∞ control according to the second embodiment of a present invention.
Figure 9:
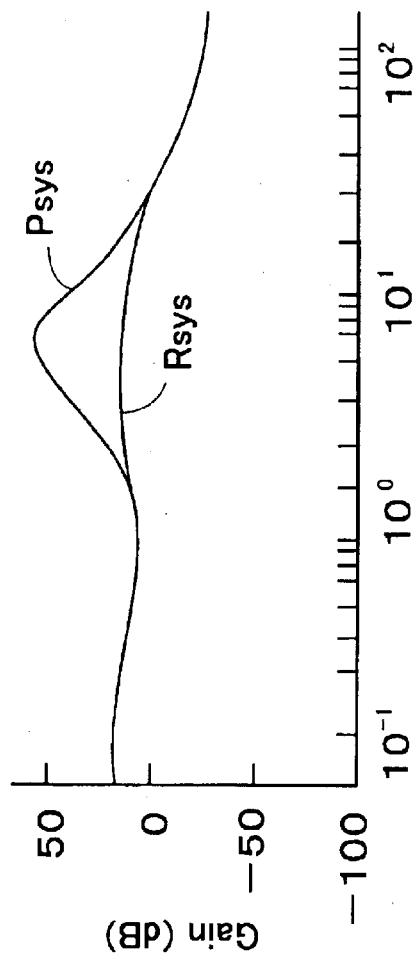
FIGS. 9(a) and 9(b) are graphs showing frequency characteristic of a real model and a reference model according to the second embodiment of the present invention.
Figure 9:
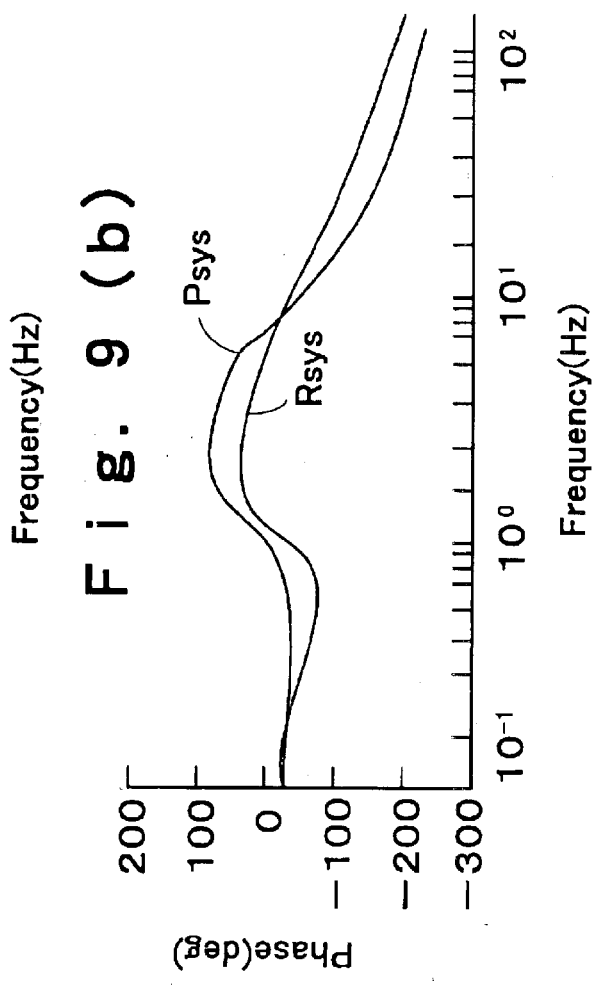

Thus the transfer characteristic fluctuates from the target torque w1 to the motor rotational number Nm as a function of driving condition, vehicle type, and motor type is determined by experiments. Further, if a switching of electric power supply for each of the coils 31, 32, 33 of the SR motor 3 is performed on a high frequency, it causes torque ripple generated on a switching time, the torque ripple effects the motor rotational number Nm. Then, the characteristic fluctuation is treated as a multiplicative fluctuation Δ1 by difference in driving condition, vehicle type, motor type, and torque ripple, etc., an input for the multiplicative fluctuation Δ1 is treated as a controlled output z2. As shown in FIG. 8, an input for the multiplicative fluctuation Δ1 is seized as the controlled output z2, an output of the multiplicative fluctuation Δ1 is seized as a perturbation input w2 (input for generalized plant), an effect of the perturbation input w2 result in a problem for determining the controller K whose difficulty appear in the controlled output z2.

More concretely, the perturbation input w2 is given to the instruction torque via the weighting function wm1, thereby a part of the above mentioned torque ripple is treated as a disturbance torque for the instruction torque. That is, a frequency characteristic of the part of the torque ripple is described by the weighting function wm1. The weighting function wm1 is set so as to increase the gain at the high frequency band for the resonance point. Further, the control system is established so as to obtain the controlled output z2 repressing a change of the transfer characteristic by difference in the above-mentioned driving condition, vehicle type, and motor type etc. as the weighting function wm2. the weighting function wm2 is set so as to increase the gain at a low frequency band. By the above-mentioned explanation, it is possible to solve a problem obtaining the controller K for suppressing effects of the characteristic fluctuation by difference in driving condition, vehicle type, and motor type in the H∞ control problem.

On the creation of the generalized plant, the H∞ norm for the transfer characteristic (transfer function) from the perturbation input w2 to the controlled output z2 is set as shown in formula 4 so as to satisfy a first robust stability condition.

[formula 4]

Thereby, the robust stability for the multiplicative fluctuation (e.g. due to differences in driving conditions, vehicle types, and motor types) characteristic fluctuation by torque ripple) is considered.

[Derivation of Noise Characteristic/Set of Weighting Function]

The motor rotational number Nm is a detected amount using the control for the electric motor, the motor rotational number Nm includes sensor noise (white noise) detected from the resolver 16. Further, as the motor rotational number Nm corresponds to an integral value from before a predetermined time of a generating torque of the SR motor 3 to a present time, when the generating torque becomes "0", the generating torque does not become "0" at once, it maintains a constant value. It is called a steady component of the motor rotational number. On the other hand, the real, model Psys is designed as a linear model at a vicinity of the resonance point. Accordingly, it is necessary that the steady component of the motor rotational number is eliminated so as to improve the performance. Then, the disturbance (e.g. sensor noise and the steady component of the motor rotational number etc.) is treated as an additive fluctuation. As shown in FIG. 8, an input for the additive fluctuation Δ2 is seized as the controlled output z2, an output of the additive fluctuation Δ2 is seized as a sensor noise w3, effects by the sensor noise w3 result in a problem for determining the controller K whose difficulty appear in the controlled output z2.

More concretely, noise characteristic which eliminates the above-mentioned sensor noise and the steady component of the motor rotational number is expressed as the weighting function wn for the sensor noise w3, the sensor noise w3 is inputted between the actual model Psys and the controller K via the weighting function wn.

By the way, on the control system, if the gain of the weighting function wn is set so as to be large at the low frequency band, the steady component of the motor rotational number which has a large effect for the sensor noise can be eliminated suitably.

On the creation of the generalized plant, the H∞ norm for the transfer characteristic (transfer function) from the sensor noise w3 to the controlled output z2 is set such as formula 5 so as to be satisfied with a second robust stability condition.

[formula 5]

Thereby, the robust stability for an additive fluctuation (the characteristic fluctuation by the sensor noise and the steady component of the motor rotational number etc.) is considered.

Considering the nominal performance condition (formula 2), the first robust stability condition (formula 4), and the second robust stability condition (formula 5), the vibration reduction control system of the SR motor 3 is expressed by the generalized plant on the H∞ control shown in FIG. 8.

Next, when a disturbance torque of the above-mentioned torque ripple etc., the characteristic fluctuation due to difference in vehicle type, motor type, the characteristic fluctuation by disturbance of the sensor noise etc. happens, a control method which does not deteriorate the sensibility characteristic (the torque tracking performance and the vibration reduction) will be explained hereinafter in detail.

[Robust Performance Problem]

Figure 10:
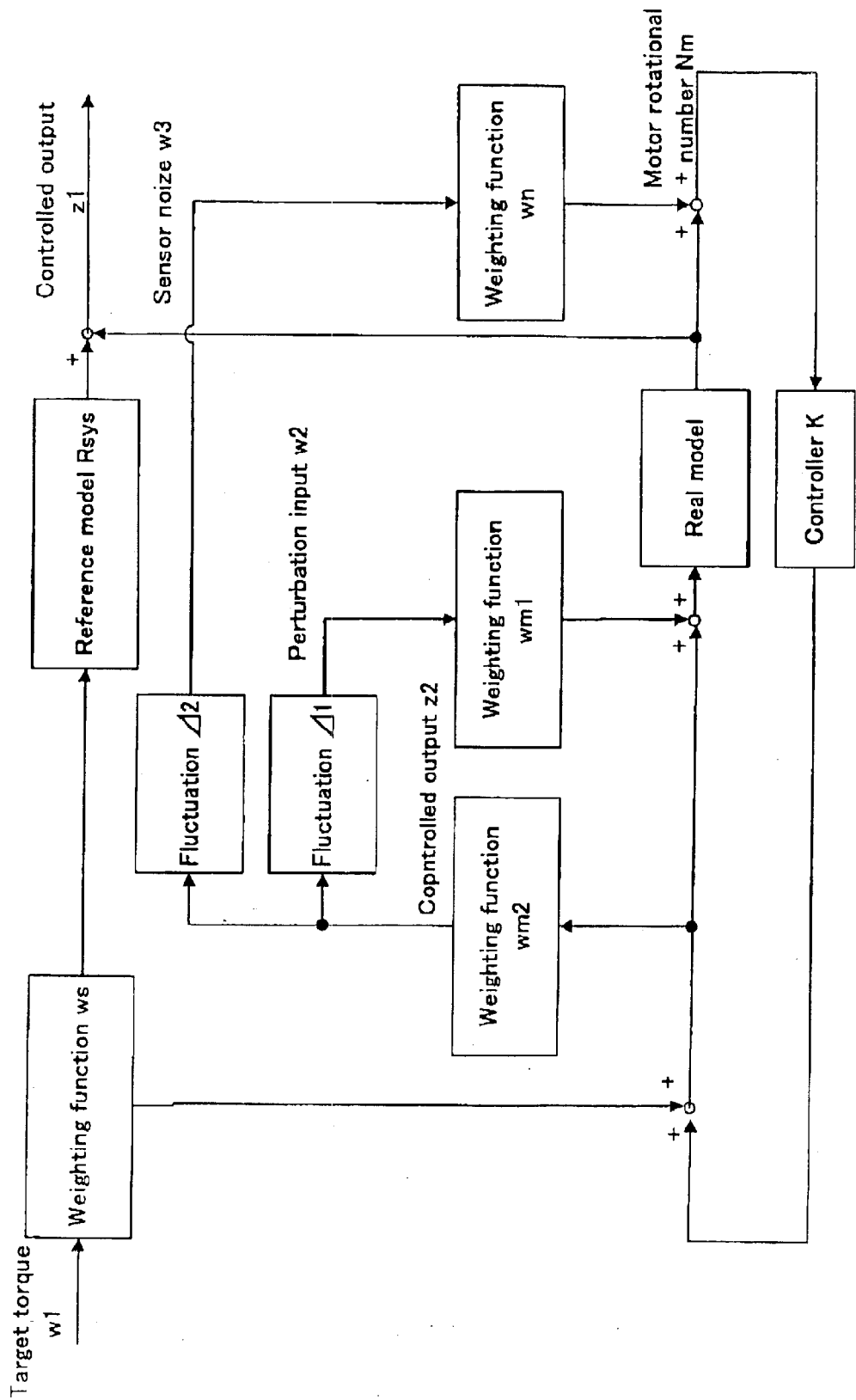
FIG. 10 is a block diagram for determining the controller by H∞ control according to the second embodiment of the present invention.

On the control system including the multiplicative fluctuation Δ1 and the additive fluctuation Δ2 shown in FIG. 10, the sensibility characteristic for the model occurred fluctuation is considered that the H∞ norm for the transfer function from the target torque w1 to the controlled output z1 comes to an establishment of a robust performance condition on formula 6.

[formula 6]

The sensibility characteristic of the control system is shifted by model errors (the multiplicative fluctuation Δ1 and the additive fluctuation Δ2). However, the fluctuation of this sensibility characteristic is treated as a stable virtually model error Δs under the robust performance problem. That is, the model error according to the characteristic fluctuation and a virtual model error Δs corresponding to the sensibility characteristic is treated as an independent structured fluctuation shown in FIG. 8. In this case, it is known what formula 6 of the robust performance condition is established to be equal to the control system stabilized for all over model errors which satisfies with formula 7. It is possible to design as H∞ control with constant scaling matrix as this problem is a problem which estimates the robust stability shown in FIG. 8.

[Design of H∞ Control System with Constant Scaling Matrix]

What robust performance problem is equal to the robust stability problem on the control system shown in FIG. 8. is known. If the scaling matrix D is defined as formula 8, a full condition of the robust stability problem is expressed by formula 9.

[formula 8]

[formula 9]

In formula 9, Tzw is a transfer function from the exogenous input w to the controlled output z, a ring matrix adjusts a scaling (ratio) between a fluctuation (model error Δs) of the sensibility characteristic and model errors (the multiplicative fluctuation Δ1 and the additive fluctuation Δ2) so as not to change a size of the transfer function Tzw by formula 9. That is, the ratio between the fluctuation of the sensibility characteristic and the model error can be balanced by set of the scaling matrix D. The problem finding out the scaling matrix D and the controller K which satisfies the condition is the H∞ control problem with constant scaling matrix. In this case, it may be standardized as "ds=1". Further, as the scaling between the fluctuation of the sensibility characteristic and the model error is a point (focus), it may be treated together with the multiplicative fluctuation and the additive fluctuation. Therefore, "d1=d2=d" is established on a relationship between d1, d2, and d3, thereby it is made up of formula 10.

[formula 10]

Formula 11 which is defined by a convex concurrence is considered for the scaling matrix D on formula 10 is considered.

[formula 11]

the function f(d) shown in formula 11 is the H∞ norm corresponding to when the controller K(s) which affords the H∞ norm on the formula 9 to a maximum value is searched for predetermined parameter d. The maximum value needs to be less than "1" so as to be satisfied with formula 9. a value of the f(d) is searched and determined by γ-repetition method if the parameter d is given to formula 11. the γ-repetition method is searched for the controller k(s) and f(d) at that time if the H∞ norm of formula 9 is less than predetermined value γ (in this case, "1") by a repetition method on numerical value analysis. A local minimum value of "f(d)" is searched by fall method on numerical value analysis. If the local minimum value is a minimum value, it is convenient. When a condition feedback is performed, the function f(d) is narrowly a semi-convex function on convex ensemble, it is proven that a point giving the minimum value is only one. However, it is not proven that the point giving the minimum value is single. When the feedback control is performed, it is expected that a semi-convex characteristic is established, anti-example is not shown. Optimum solution of the scaling matrix D is local minimum value of "f(d)". Fortunately, as formula 11 is function of only parameter d, the scaling matrix D and the controller K(s) are determined at next step.

[Design Method of H∞ Control Problem with Constant Scaling Matrix]

(Step 1)

The controller K(s) is determined by γ-repetition method as the H∞ control problem, if "d_min" is set by a low value (d=d_min). H∞ norm at that time is memorized as "f(d_min)".

(Step 2)

Similarly, the controller K(s) on the H∞ control problem is calculated as "d=d+0.1", the H∞ norm is made f(d_2). The calculation is repeated till "d=d_max", the H∞ norm is memorized.

(Step 3)

A local minimum value of the function f(d) for "d" is searched, "d" at that time is adopted as scaling matrix D.

(Step 4)

The controller K(s) is determined by γ-repetition method using the value of "d" given local minimum value of function f(d), thereby the controller K(s) comes to an optimal solution.

Solution method on the H∞ control problem is an approach which solves Riccati equation and an approach which solves LMI (Liner Matrix Inequality) problem (based on Riccati inequality), in this case, each approach may be used. In this embodiment, the controller K(s) is derived by the approach of the LMI base. The approach of the LMI base is more complicated than the approach of Riccati base for calculation of a large problem, however, the approach of the LMI base is able to eliminate restriction of nonsingular of the Riccati base. That is, the approach of the LMI base is a feature which applies to any plants.

The controller K(s) or the like is derived by using the control system design such as CAD "MATLAB" on the design method.

Sets of the weighting function and the reference model Rsys are performed for the constructed generalized plant, the controller K(s) is rebuilt many times so as to satisfy a design spec in design cycle, the design for the controller K(s) is finished when the controller K(s) satisfies with the design spec.

As above-mentioned, a request spec of the SR motor 3 is expressed by the generalized plant on the H∞ control, the optimum solution is calculated at above-mentioned steps 1–4 as the H∞ control problem with constant scaling matrix. Thereby, even if the fluctuation of motor characteristic and characteristic dispersion by vehicle types happen, it is possible to establish the vibration reduction control of the SR motor 3 which does not deteriorate the torque tracking performance and the vibration reduction.

[Model Reduction for Controller]

A model reduction process for the designed controller K(s) is performed. When the controller K(s) is installed in the microcomputer 7, the microcomputer 7 executes the control, a calculating load of the microcomputer 7, the calculation becomes difficult at a predetermined sampling interval if order of the controller is large. For this reason, the controller with high dimension is made to be of low dimension (reduced model) without change of the frequency characteristic. The reduced model means a method wherein characteristic of the designed controller K(s) does not change, order for the controller is made low.

[Discrete]

Then, discrete calculation corresponding to order number "n" of the reduced model for the controller is performed where synchronizing the sampling time of the microcomputer, thereby corrected amount u(k) shown in formula 12 can be obtained. Further, coefficients "ai" and "bi" are coefficients depending on discreteness of the reduced model for the controller respectively.

[formula 12]

[Set Example of Weighting Function/Result Example of Calculation]

The weighting function "ws" may be set so as to be large at a frequency band wherein the actual response approaches the reference model Rsys, however, the weighting function is set such as "ws=1" so as to be simple in this embodiment.

In this embodiment, a sample of each weighting function is shown by formula 13.

[formula 13]

If the controller K(s) and the scaling matrix D is determined by using the above-mentioned weighting function at design steps, the ws(s) and the D are established by formulas 14, 15.

[formula 14]

[formula 15]

In this embodiment, the controller K(s) of the 14-order, the order of the controller is reduced to 6-order so as not to change the frequency characteristic.

Figure 11:
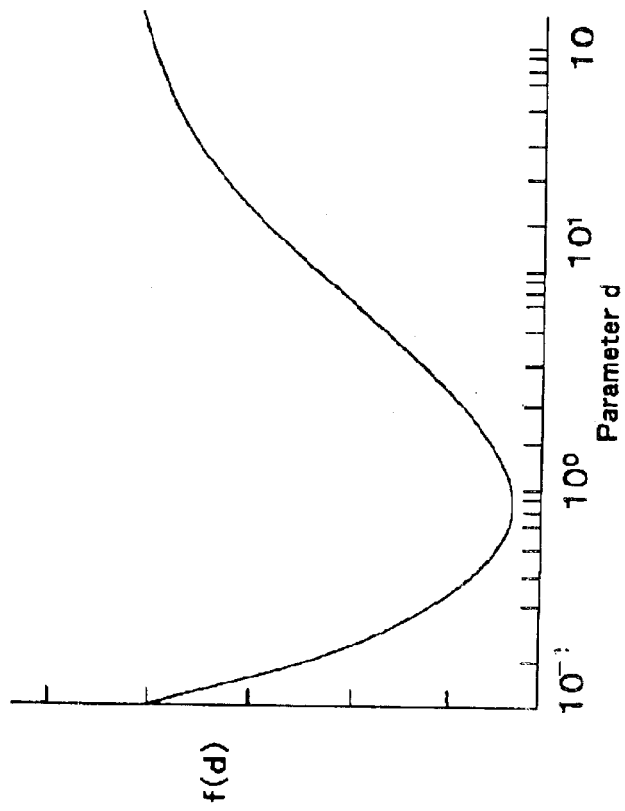
FIG. 11 is a graph showing a function f(d) according to the second embodiment of the present invention.

Farther, a characteristic of the function f(d) shows convex function when the parameter "d" changes from 0.1 to 100 as shown in FIG. 11.

Figure 12:
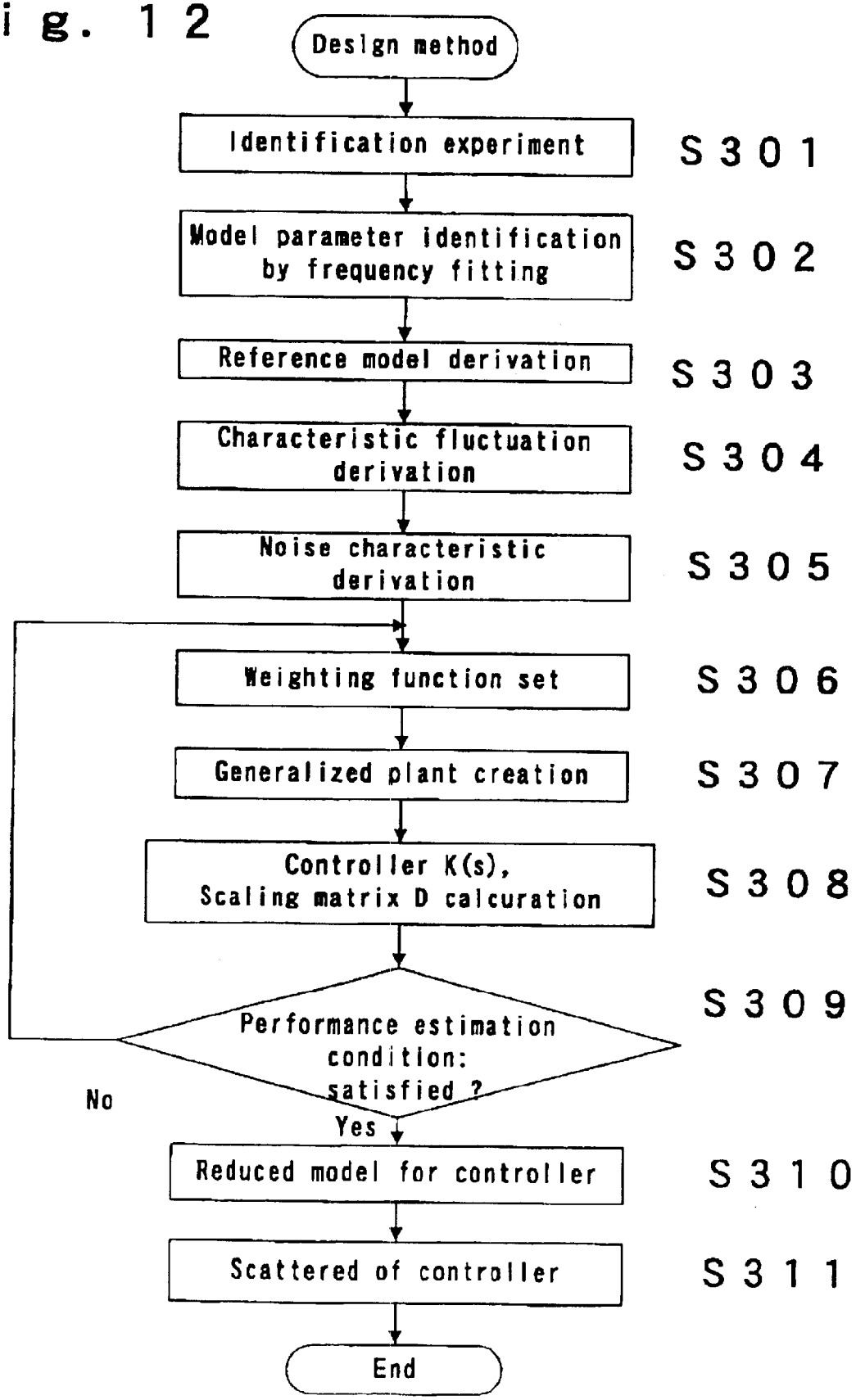
FIG. 12 is a flowchart showing steps of a design method according to the second embodiment of the present invention.

FIG. 12 is a flowchart showing a design step for determining the above-mentioned controller K. Simply speaking, at first, an identification experiment is performed so as to obtain a real model (S301), then an identification of model parameter by frequency fitting is performed (S302), the real model is determined. Next, the reference model Rsys is derived (S303). The real model is investigated to account for the characteristic fluctuation due to differences in driving conditions, vehicle type, and torque ripple (S304), and the real model is investigated to determine whether a fluctuation range of the real model by the sensor noise includes these characteristics (S305).

Next, weighting function "ws, wm1, wm2, and wn" are set based on the investigated characteristic fluctuation and noise characteristic etc. (S306), the generalized plant is created shown in FIG. 8 (S307). Next, the controller K(s) and the scaling matrix D is calculated by the above-mentioned "MATLAB" (S308). The MATLAB judges whether or not the performance estimation condition is satisfied (S309).

At this stage, the program repeats at S306–S308 if the performance estimation condition is not satisfied at S309. Further, when the performance estimation condition is satisfied at S309, the controller K(s) is performed model reduction for the controller K (S310), the discrete of the reduced model for the controller K is performed (S311).

Figure 13:
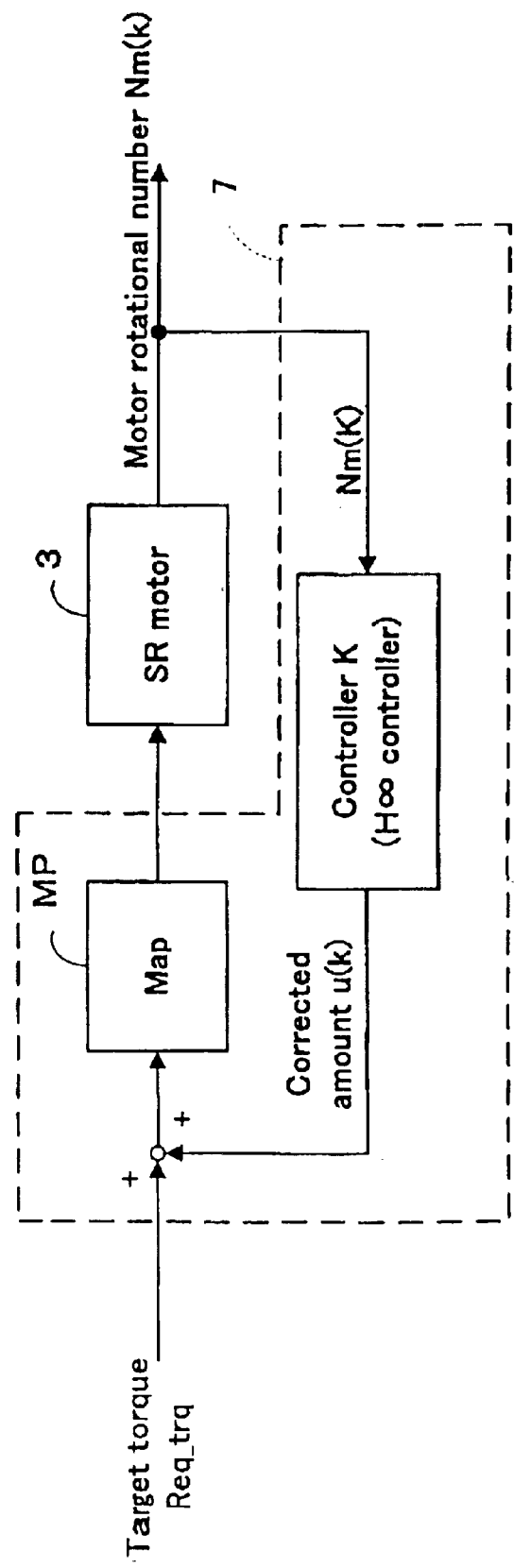
FIG. 13 is a block diagram showing control contents of a vibration reduction control according to the second embodiment of the present invention.
Figure 16:
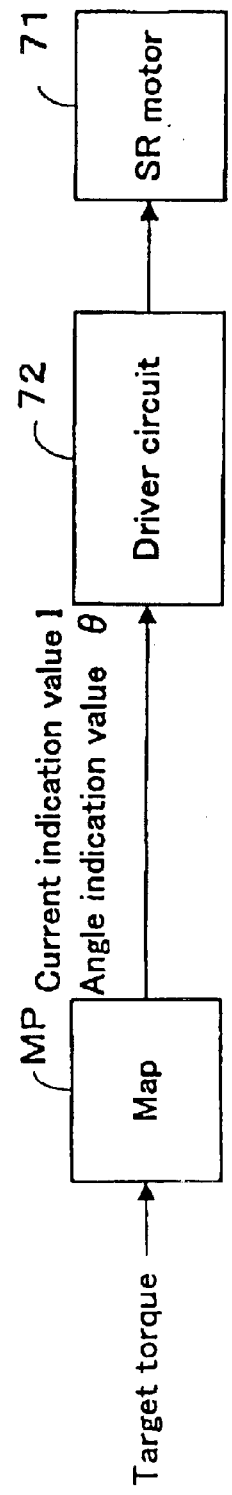
FIG. 16 is a block diagram showing contents of a conventional motor control.

FIG. 13 is a block diagram showing the reduced model of the controller K (H∞ controller) installed in the microcomputer 7. That is, the microcomputer 7 is inputted the throttle opening angle α by the accelerator sensor 13, the target torque Req_trq is found out from the map M as shown in FIG. 3. Then, based on the throttle opening angle α, the current instruction value I and the angle instruction value θ are determined by a map (not shown), the microcomputer 7 gives current depending on the current instruction value I and the angle instruction value θ for the SR motor 3. On the other hand, the microcomputer 7 receives as input the motor rotational number Nm(k) obtained from the resolver 16, the corrected amount u(k) according to formula 12 by the above-mentioned controller K is calculated, the corrected amount u(k) is added to the target torque Req_trq.

Figure 14:
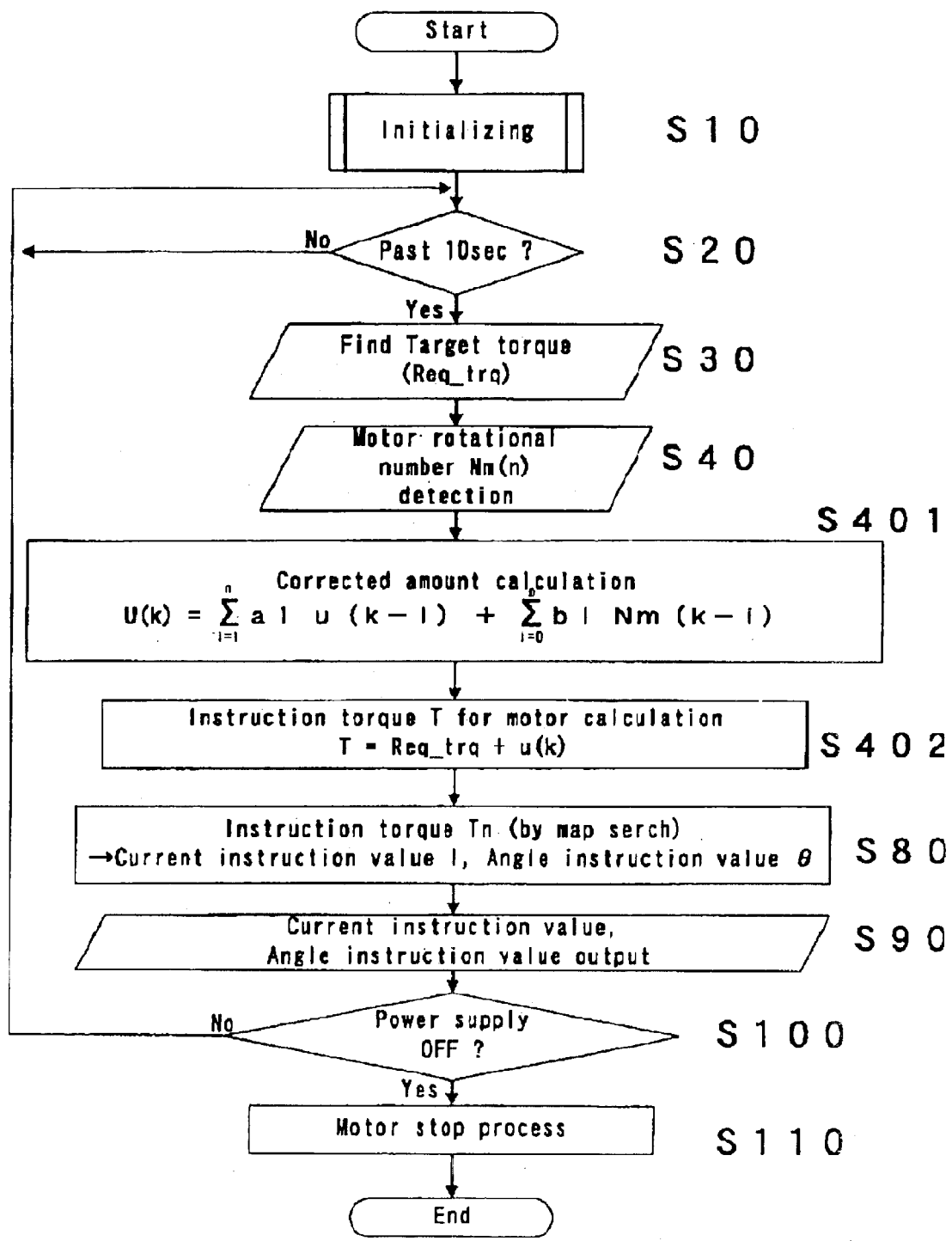
FIG. 14 is a flowchart showing a routine of the vibration reduction control for the motor according to the second embodiment of the present invention.

The control on the block diagram shown in FIG. 13 is realized by software, the vibration reduction control program for the motor shown in a flowchart in FIG. 14 is memorized in the memory 18 of the microcomputer 7. the vibration reduction control program for the motor will be explained hereinafter.

The program executes a process at S10 to S40 same as the first embodiment, the corrected amount calculating process is performed at S401. That is, the corrected amount u(k) is calculated according to formula 12. the corrected amount u(k) means corrected amount gained by a calculation of this time, and the motor rotational number Nm(k) means a motor rotational number Nm gained thereby. Further, the corrected amount u(k I) means an corrected amount u gained by a calculation before I-time, and the motor rotational number Nm means a motor rotational number Nm gained thereby. In this embodiment, the model is reduced at 6-order, a present corrected amount u(k) is calculated based on the correcting amount u and the motor rotational number Nm which is before 6 times.

At S402, the instruction torque T is calculated for the motor. That is, the instruction torque T is calculated by formula "T=Req_trq+u(k)". In other words, the instruction torque T is obtained by which the corrected amount u(k) is added to the target torque T.

The program executes the process of S80–S110 similar to the first embodiment. Similarly, the target torque Req_trq is determined based on the throttle opening angle α, the target torque Req_trq is corrected by the corrected amount u(k) determined by the actually motor rotational number Nm and the controller K. Thereby the instruction torque T is determined, the SR motor 3 is turned on according to the instruction torque T.

Figure 15:
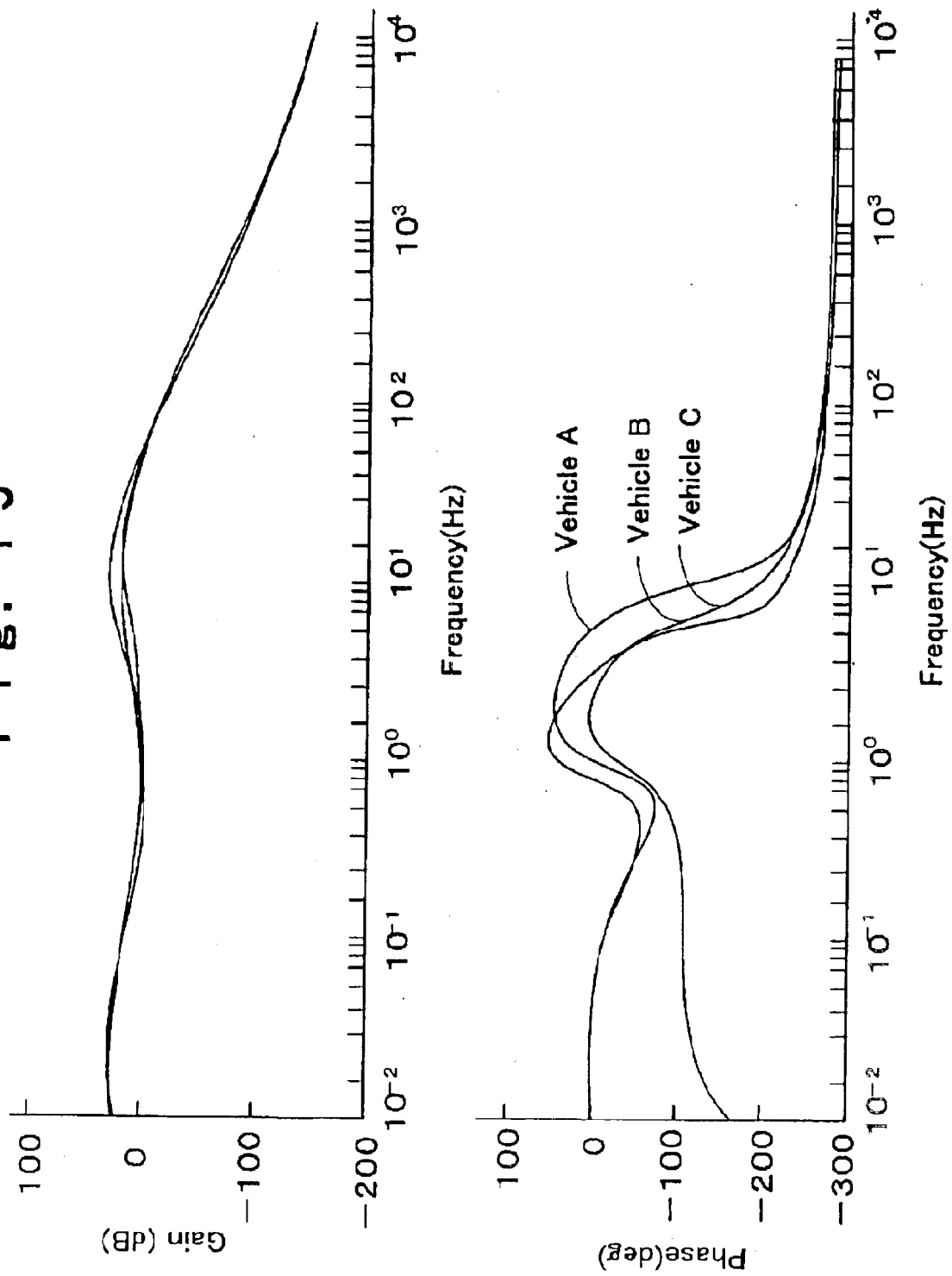
FIG. 15 is a graph for explaining the vibration reduction effects at a characteristic fluctuation time according to the second embodiment of the present invention.

Concerning to the SR motor 3 which may be controlled as described above, FIG. 15 is a graph showing experiment value of the frequency characteristic for the characteristic fluctuation. Further, FIG. 15 is a graph for explaining the characteristic fluctuation when the SR motor 3 is mounted on different vehicle types (vehicle A, vehicle B, and vehicle C). FIG. 15 shows a point at which deterioration of the sensibility characteristic is suppressed even if the SR motor 3 is mounted on different vehicle types.

According to the present embodiment as above-mentioned, effects are described hereinafter.

(1) In this embodiment, effects by the characteristic fluctuation of the control system can be suppressed, the robust stability of the control system can be secured as the corrected amount u(k) gained by the controller K is added to the target torque Req_trq of the SR motor 3, the sensibility characteristic can be approximately compensated when the characteristic fluctuation happens. Accordingly, when the characteristic fluctuation happens for the control system, the vibration of the SR motor 3 can be suppressed suitably, and the torque tracking performance can be secured suitably.

Further, as the robust stability can be secured and the sensibility characteristic can be compensated by single controller K as described above, man hour for adjusting the controller reduces, and part (controller) is made up in common.

(2) In this embodiment, sensibility characteristic Nm can be compensated for the characteristic fluctuation relating to difference in driving condition, the SR motor 3, a vehicle body 1a assembled with the SR motor 3, torque ripple, sensor noise and steady component of the motor rotational number.

(3) In this embodiment, the vibration reduction and accelerating performance of the vehicle can be made suitable as vibration reduction and torque tracking performance are improved. Furthermore, this embodiment does not limit the above-mentioned structure, e.g. the above-mentioned invention may be applied to a following another embodiment.

In the first embodiment, it may be a filter which is more than a three order instead of a two order. Further, a high pass filter may be use instead of the band pass filter.

In the first embodiment, the predetermined frequency of the vibration signal taken out from the motor rotational signal for performing the vibration reduction control may be suitably changed. For example, a range including the frequency based on the natural frequency of the vehicle body 1a differs from a species of the vehicle may be changed.

In the first embodiment, the correcting process does not limit the PD control calculation. For example, the proportional control calculation or the differential control calculation may be adopted. Thereby, it is able to reduce the vibration. Furthermore, well-known control calculation for reducing the vibration may be adopted.

In the first embodiment, a correction by the PD control calculation performs against the target torque Req_trq, but a correction by the PD control calculation may be performed against the torque instruction value. That is, at first, the torque instruction value trq(n) is calculated by using the formula (1) based on the target torque Req_trq. Then, the corrected amount PD_out which is an output of the PD calculating portion 52 through the band pass filter 51 is subtracted from the target torque Req_trq. The parameter for obtaining the current instruction value I and the angle instruction value θ by a change using the map MP uses the torque instruction value trq(n) (=Req_trq PD_out) which is a target value after the correction process and another parameters Nm, Vb. Further, the motor control may be executed by using the target torque Req_trq as the torque instruction value.

In the first embodiment, the digital filter is constructed by software, digital filter made by hardware may be constructed, and the band pass filter 51 may be constructed by digital filter of hardware. Further, a band pass filter by an analog circuit may be used. A digital value is obtained through the A D converter for a signal through the band pass filter. The PD control calculation based on the digital data is executed, the correcting value for the feedback control is calculated. The feedback control of the vibration reduction control by using this method can be realized.

In the first embodiment, the vibration reduction control adopts to the feedback control of the PD control calculation, a motor torque control basically adopts the open loop control (feed forward control). For example, the feedback control wherein the motor torque approaches the torque instruction value may be performed. In this case, a correcting calculation which effectively reduce the vibration of the PD control calculation etc. for a frequency band of a vibration reduction object is adopted, two kinds of a feedback control systems are disposed in parallel.

Figure 7:
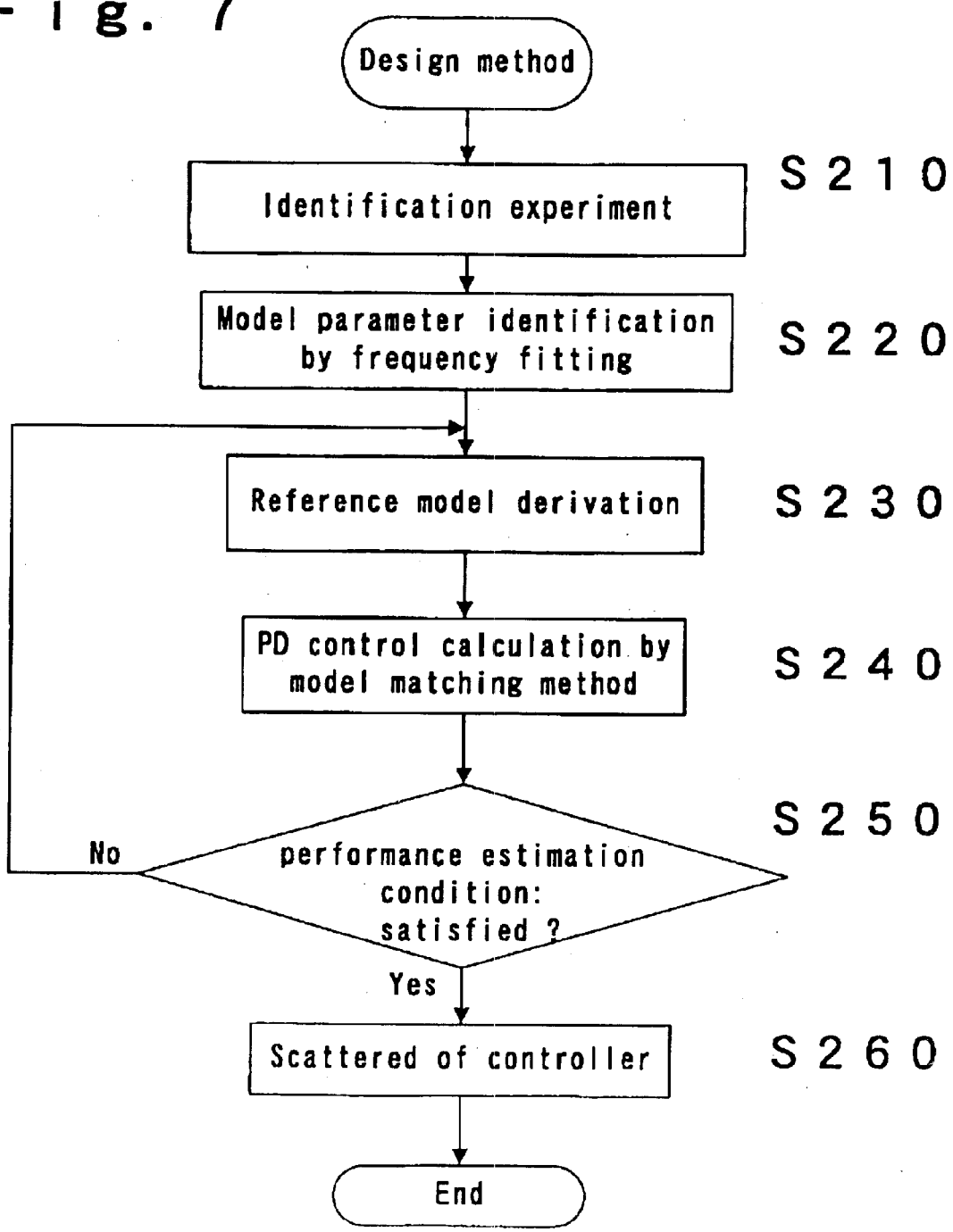
FIG. 7 is a flowchart showing steps of a design method according to the first embodiment of the present invention.

In the first embodiment, determining the coefficients used in the correction calculation (PD control calculation) is not limited to the design method as shown in FIG. 7. Another design method, or coefficients gained by experience, may be use.

In the second embodiment, at least one of the differences in driving condition, SR motor type, and the vehicle body 1a assembled with the SR motor 3 such as the characteristic fluctuation, torque ripple, sensor noise, and steady component of the motor rotational number Nm may be omitted.

In the second embodiment, the corrected amount u(k) gained form the controller K is added to the target torque Req_trq, but the corrected amount u(k) may be subtracted from the target torque Req_trq. It refers to a difference of code of the corrected amount u(k) gained from the controller K.

In the second embodiment, the controller K(s) of the 14-order is reduced to the controller of the 6-order, the order for the controller K(s) may be reduced to another order. Further, model reduction process may be omitted.

In the first and second embodiments, the electric motor is not limited to the SR motor, the electric motor may be use as an electric motor for controlling the motoring and the regeneration. For example, the electric motor may be an alternating current reluctance motor.

This invention is not limited to be adopted to the vibration reduction control of the electric motor for the electric vehicle, this invention may be adopted to an electric vehicle without an automobile. Further, the vibration reduction control may be adopted to the electric motor for a purpose other than for vehicle driving source. In this case, the rotational unevenness caused by the vibration of the electric motor is reduced to be as small as possible, a rotation of the electric motor becomes stable. This vibration reduction control may be adopted to an electric motor used for another purpose, i.e. other than for the vehicle. In this case, the rotational unevenness caused by the vibration of the electric motor is reduced to be as small as possible.

Further technical thoughts comprehended from the above mentioned embodiment will be explained hereinafter.

(1) According to one embodiment, the filter means is a digital filter consisting of the software.

(2) According to another embodiment, the correction calculation by the correcting means includes at least a proportional control.

(3) According to another embodiment, the correction calculation by the correcting means includes at least a differential control.

(4) According to another embodiment, the control means controling the electric motor is controlled by the torque control so as to correspond with a target value determined according to a detected result by the accelerator opening detecting means for detecting the operating amount of the accelerator operating means.

(5) According to another embodiment, one of the technical thoughts of the above mentioned (1) (4), the control means performs the torque control of the electric motor on the open loop. The feedback control is only used as an object of the vibration reduction control, a frequency signal of the motor rotational number is not necessarily an object of the torque control of the electric motor.

According to (1) above, the rotational unevenness causes by the vibration of the electric motor can be reduced. For example, on the vehicle mounted on the electric motor such as the vehicle driving source, though the electric motor is vibrated by the vibration of the vehicle body 1a, the rotational unevenness is able to be reduced to be as small as possible, thereby the little by little vibration for the front and rear directions of the vehicle body 1a can be reduced.

Accordingly, the design for a purpose of the vibration reduction control performs suitably.

According to the invention, effect by the characteristic fluctuation of the control system can be reduced, thereby, the robust stability on the control system can be secured, sensibility characteristic when the characteristic fluctuation happens can be approximately compensated, thereby the vibration reduction and torque tracking performance can be compensated. Accordingly, the vibration for the electric motor can be reduced suitably and the torque tracking performance can be secured suitably when the characteristic fluctuation happens on the control system.

The Robust stability is secured and the sensibility characteristic for characteristic fluctuation is compensated by single controller, thereby man time for adjusting the controller is reduced or omitted, and parts of the controller can be common.

According to the invention, the sensibility characteristic can be compensated for the characteristic fluctuation relating to at least one of the differences in driving condition, electric motor, assembly of the body assembled with the electric motor, torque ripple, sensor noise, and steady component of the motor rotational number.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

$$z1 = ws \cdot Rsys \cdot w1 - \frac{ws \cdot Psys}{1 + K \cdot Psys} w1 \qquad \text{[formula 1]}$$

$$= ws \cdot \left(Rsys - \frac{Psys}{1 + K \cdot Psys}\right) w1$$

$$\left\| ws \cdot \left(Rsys - \frac{Psys}{1 + K \cdot Psys}\right) \right\|_\infty < \gamma \qquad \text{[formula 2]}$$

$$\|z1\| < \gamma \|w1\| \qquad \text{[formula 3]}$$

-continued $$\left\|\frac{Psys \cdot K \cdot wm1 \cdot wm2}{1+Psys \cdot K}\right\|_\infty < 1 \quad \text{[formula 4]}$$

$$\left\|\frac{K \cdot wn \cdot wm2}{1+Psys \cdot K}\right\|_\infty < 1 \quad \text{[formula 5]}$$

$$\max_{\Delta 1 \Delta 2}\left\|ws \cdot \left(Rsys - \frac{Psys(1+\Delta 1)+\Delta 2}{1+K(Psys(1+\Delta 1)+\Delta 2)}\right)\right\|_\infty < \gamma \quad \text{[formula 6]}$$

$$|\Delta 1| < 1, |\Delta 2| < 1, |\Delta s| < 1 \quad \text{[formula 7]}$$

$$D = diag(ds, d1, d2) \quad \text{[formula 8]}$$

$$\|DT_{ZW}D^{-1}\|_\infty < 1 \quad \text{[formula 9]}$$

$$D = diag(1, d, d) \quad \text{[formula 10]}$$

$$f(d) : \inf_K \|DT_{ZW}D^{-1}\|_\infty \quad \text{[formula 11]}$$

$$U(k) = \sum_{i=1}^{n} ai \cdot u(k-i) + \sum_{i=0}^{n} bi \cdot Nm(k-i) \quad \text{[formula 12]}$$

$$ws(s) = 1 \quad \text{[formula 13]}$$

$$wm1(s) = \frac{2(s+0.6213)}{(S+25.13)}$$

$$wn(s) = 18$$

$$wm2 = \frac{6.25(s+25.13)^2(s+25.13)}{(s+314.2)(s+6283)^2}$$

$$ws(s) = \frac{\begin{array}{c}0.14718(s+342.7)(s+23.59)\\(s+8.618)(s^2+1.253s+0.3926)\\(s^2-6.478s+11.49)(s^2+83.48s+3234)\\(s^2 708.8s+2.487e^5)\\(s^2+719.8s+2.621e^5)\end{array}}{\begin{array}{c}(s+120.7)(s+25.13)(s+0.6351)\\(s^2+8.587s+24.92)(s^2+22.75s+50.22)\\(s^2+118.1s+1.22e^4)\\(s^2+708.8s+2.487e^5)\\(s^2+719.8s+2.621e^5)\end{array}} \quad \text{[formula 14]}$$

$$D = diag(1, 1.788, 1.1788) \quad \text{[formula 15]}$$

What is claimed is:

1. A vibration reduction control for an electric motor, the control comprising:
an express means for expressing by a generalized plant on H∞ control problem including characteristic fluctuation and sensibility characteristic of a control system for a transfer function of the controller;
a deal means for dealing a model error corresponding to the characteristic fluctuation and a virtual model error corresponding to a fluctuation of the sensibility characteristic as a structural fluctuation dependently; and
a derive means for adding a scaling matrix with scaling parameter corresponding to the each structural fluctuation to the generalized plant, and deriving the scaling matrix and the controller so as to minimize a H∞ norm of the generalized plant as a H∞ control problem with constant scaling matrix.

2. A design method of a vibration reduction control for an electric motor includes a controller for obtaining a corrected amount performing an addition or a subtraction for an instruction value on the torque control of the electric motor based on a motor rotational number, the method comprising:
setting a scale parameter d to a predetermined standard value; calculating the controller K(s) by γ-repeat method as H∞ control problem;
memorizing a H∞ norm of the generalized plant corresponding to a scaling parameter d at that time,
calculating the controller by gradually changing from the standard value for the scaling parameter d;
memorizing H∞ norm of the generalized plant corresponding to the scaling parameter d at that time,
calculating a local minimum value regarding H∞ norm of the generalized plant as a function f(d) for the scaling parameter d; establishing a scaling matrix D by a value of the scaling parameter d at that time;
calculating the controller K(s) by γ-repeat method using the value of the scaling parameter d giving local minimum value of function f(d);
and regarding the controller K(s) as an optimum solution, wherein
the optimum solution of the H∞ control problem with constant scaling matrix is calculated according to each of the processing steps.

3. A design method of a vibration reduction control for a electric motor, the method comprising:
an identification experiment step of performing an identification experiment for the electric motor;
a model parameter identification step of calculating coefficients of a frequency transfer function based on an input signal and an output signal for the electric motor;
a reference model establishing step of establishing a reference model;
a correction coefficient calculating step of calculating a proportional gain and a differential gain of a controller so as to correspond with the reference model by using a model matching method; and
a judging step of judging whether an apparatus including a controller fulfills a predetermined performance condition or not; wherein
when the apparatus does not fulfill the performance condition, the proportional gain and the differential gain are repeatedly calculated by the correction coefficient calculating step until the apparatus fulfills the performance condition.

4. A design method of a vibration reduction control for an electric motor according to claim 3, the method further comprising:
a discrete step of performing a discrete processing when the apparatus satisfies the performance condition judged by the judging step.

* * * * *